(12) United States Patent
Lin et al.

(10) Patent No.: US 11,967,898 B2
(45) Date of Patent: Apr. 23, 2024

(54) SOFT-SWITCHING POWER CONVERTER

(71) Applicant: DELTA ELECTRONICS, INC., Taoyuan (TW)

(72) Inventors: Hung-Chieh Lin, Taoyuan (TW);
Yi-Ping Hsieh, Taoyuan (TW);
Jin-Zhong Huang, Taoyuan (TW);
Hung-Yu Huang, Taoyuan (TW);
Chih-Hsien Li, Taoyuan (TW);
Ciao-Yin Pan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 13 days.

(21) Appl. No.: 17/569,885

(22) Filed: Jan. 6, 2022

(65) Prior Publication Data
US 2022/0255416 A1 Aug. 11, 2022

(30) Foreign Application Priority Data
Feb. 8, 2021 (CN) .......................... 202110172189.2

(51) Int. Cl.
*H02M 3/155* (2006.01)
*H02M 1/00* (2006.01)
(Continued)

(52) U.S. Cl.
CPC ......... *H02M 3/155* (2013.01); *H02M 1/0058* (2021.05); *H02M 3/158* (2013.01);
(Continued)

(58) Field of Classification Search
CPC .... H02M 1/0058; H02M 3/155; H02M 3/158; H02M 7/53871; H02M 1/42;
(Continued)

(56) References Cited

U.S. PATENT DOCUMENTS 1,691,125 A * 11/1928 Polydoroff .............. H01F 19/04
330/171
2,388,070 A * 10/1945 Middel ..................... H03F 9/04
324/123 R
(Continued)

OTHER PUBLICATIONS

European Search Report dated Jun. 28, 2022 in EP Application No. 22155343.1, 11 pages.
(Continued)

*Primary Examiner* — Yusef A Ahmed
(74) *Attorney, Agent, or Firm* — Muncy, Geissler, Olds & Lowe, P.C.

(57) ABSTRACT

A soft-switching power converter includes a main switch, an energy-releasing switch, and an inductive coupled unit. The main switch is a controllable switch. The energy-releasing switch is coupled to the main switch. The inductive coupled unit is coupled to the main switch and the energy-releasing switch. The inductive coupled unit includes a first inductance, a second inductance coupled to the first inductance, and an auxiliary switch unit. The auxiliary switch unit is coupled to the second inductance to form a closed loop. The main switch and the energy-releasing switch are alternately turned on and turned off. The auxiliary switch unit is controlled to start turning on before the main switch is turned on so as to provide at least one current path.

5 Claims, 21 Drawing Sheets

(51) Int. Cl.
*H02M 3/158* (2006.01)
*H02M 7/5387* (2007.01)
*H02M 1/42* (2007.01)
*H02M 7/48* (2007.01)

(52) U.S. Cl.
CPC .......... *H02M 7/53871* (2013.01); *H02M 1/42* (2013.01); *H02M 7/4815* (2021.05)

(58) Field of Classification Search
CPC .. H02M 7/4815; H02M 1/342; H02M 1/0064; H02M 3/3353; H02M 3/33592; Y02B 70/10
See application file for complete search history.

(56) References Cited

U.S. PATENT DOCUMENTS

| | | | | |
|---|---|---|---|---|
| 2,762,020 | A * | 9/1956 | Gordon | H01F 29/14 336/87 |
| 4,325,096 | A * | 4/1982 | Sunohara | H01F 38/28 361/45 |
| 5,073,849 | A * | 12/1991 | Morris | H02M 3/335 363/24 |
| 5,195,232 | A * | 3/1993 | Frederick | H05K 9/0066 29/855 |
| 5,477,131 | A * | 12/1995 | Gegner | H02M 3/158 323/344 |
| 5,684,678 | A * | 11/1997 | Barrett | H02M 3/3376 363/17 |
| 5,737,203 | A * | 4/1998 | Barrett | H02M 3/33561 363/75 |
| 5,841,273 | A * | 11/1998 | Muraji | G01D 5/2073 324/207.17 |
| 6,175,178 | B1 * | 1/2001 | Tupper | H02K 7/025 310/210 |
| 6,459,213 | B1 * | 10/2002 | Nilssen | H02M 7/53832 315/DIG. 4 |
| 6,483,279 | B1 * | 11/2002 | Poss | H01F 17/06 323/251 |
| 6,512,352 | B2 * | 1/2003 | Qian | H02M 3/158 323/222 |
| 6,911,797 | B2 * | 6/2005 | Hofmann | H02M 5/44 318/575 |
| 6,921,042 | B1 * | 7/2005 | Goodzeit | H02K 55/04 335/214 |
| 6,933,822 | B2 * | 8/2005 | Haugs | G05F 1/32 336/83 |
| 7,215,101 | B2 * | 5/2007 | Chang | H02M 3/158 323/224 |
| 7,265,650 | B2 * | 9/2007 | Jang | H01F 30/06 323/344 |
| 7,915,874 | B1 * | 3/2011 | Cuk | H02M 3/158 323/224 |
| 8,669,744 | B1 * | 3/2014 | Vinciarelli | H02M 3/1582 323/235 |
| 8,878,500 | B2 * | 11/2014 | Jeong | G05F 1/70 323/225 |
| 9,391,506 | B2 * | 7/2016 | Jeong | H02M 1/4225 |
| 9,979,271 | B2 * | 5/2018 | Takahashi | H02M 3/1588 |
| 2002/0101739 | A1 | 8/2002 | Nieminen | H02M 3/33573 363/16 |
| 2002/0175571 | A1 * | 11/2002 | Gilmore | H01F 37/00 310/45 |
| 2002/0180572 | A1 * | 12/2002 | Kakehashi | H01F 41/082 335/296 |
| 2003/0025416 | A1 * | 2/2003 | Sullivan | H02K 3/04 310/162 |
| 2003/0058596 | A1 * | 3/2003 | MacBeth | G01R 15/183 361/42 |
| 2004/0066178 | A1 * | 4/2004 | Mizoguchi | H02M 3/158 323/205 |
| 2005/0265055 | A1 * | 12/2005 | Chang | H02M 3/158 363/89 |
| 2006/0082948 | A1 * | 4/2006 | Wu | H01F 17/04 361/118 |
| 2007/0040644 | A1 * | 2/2007 | Jang | H01F 30/06 336/215 |
| 2007/0115700 | A1 * | 5/2007 | Springett | H02M 3/33592 363/24 |
| 2009/0051478 | A1 * | 2/2009 | Lee | H01F 3/10 336/212 |
| 2009/0296429 | A1 * | 12/2009 | Cook | H02M 7/538 363/40 |
| 2010/0148903 | A1 * | 6/2010 | Yin | H01F 41/122 336/90 |
| 2010/0289489 | A1 * | 11/2010 | Tadatsu | G01R 33/072 335/297 |
| 2011/0285369 | A1 * | 11/2011 | Cuk | H02M 3/158 323/282 |
| 2012/0092222 | A1 * | 4/2012 | Kato | H01Q 7/00 343/742 |
| 2012/0153857 | A1 * | 6/2012 | Han | H02M 1/44 363/44 |
| 2013/0049918 | A1 * | 2/2013 | Fu | H01F 17/062 336/220 |
| 2013/0088087 | A1 * | 4/2013 | Yamamoto | H02J 50/12 307/104 |
| 2013/0088804 | A1 * | 4/2013 | Liang | H02H 3/085 324/253 |
| 2013/0141199 | A1 * | 6/2013 | Hayes | H02M 3/1584 336/5 |
| 2013/0201728 | A1 * | 8/2013 | Njiende | H01F 3/10 363/21.04 |
| 2014/0097928 | A1 * | 4/2014 | Tomonari | H01F 17/045 336/207 |
| 2014/0176289 | A1 * | 6/2014 | Won | H03H 7/427 336/215 |
| 2014/0298916 | A1 * | 10/2014 | Duan | G01L 1/125 73/779 |
| 2014/0306788 | A1 * | 10/2014 | Umetani | H01F 27/385 336/173 |
| 2015/0381047 | A1 * | 12/2015 | Chang | H02M 3/158 323/311 |
| 2017/0005563 | A1 * | 1/2017 | Ayyanar | H02M 1/088 |
| 2017/0237332 | A1 * | 8/2017 | Takahashi | H02M 1/083 323/235 |
| 2018/0061566 | A1 * | 3/2018 | Lee | H02P 6/085 |
| 2018/0342953 | A1 * | 11/2018 | Ji | H01F 30/04 |
| 2020/0211751 | A1 * | 7/2020 | Itani | H01F 27/255 |
| 2020/0253002 | A1 * | 8/2020 | Viroli | H01F 27/24 |
| 2021/0280367 | A1 * | 9/2021 | Kulsangcharoen | H01F 30/16 |
| 2022/0165484 | A1 * | 5/2022 | Fan | H01F 27/29 |
| 2023/0020072 | A1 * | 1/2023 | Xue | H02M 1/342 |

OTHER PUBLICATIONS

Xia et al.. "*Naturally Adaptive, Low-Loss Zero-Voltage-Transition Circuit for High-Frequency Full-Bridge Inverters With Hybrid PWM.*" IEEE Transactions on Power Electronics 33 (2018): pp. 4916-4933.

Lee et al. "*Novel zero-voltage-transition and zero-current-transition pulse-width-modulation converters.*" PESC97. Record 28th Annual IEEE Power Electronics Specialists Conference. Formerly Power Conditioning Specialists Conference 1970-71. Power Processing and Electronic Specialists Conference 1972 vol. 1 (1997): pp. 233-239.

* cited by examiner

SOFT-SWITCHING POWER CONVERTER

BACKGROUND

Technical Field

The present disclosure relates to a soft-switching power converter, and more particularly to a soft-switching power converter with an inductive coupled unit can implement a zero-voltage switching operation or a zero-current switching operation.

Description of Related Art

The statements in this section merely provide background information related to the present disclosure and do not necessarily constitute prior art.

Please refer to FIG. 1 and FIG. 2, which shows a circuit diagram of a conventional buck DC-to-DC converter and a circuit diagram of a conventional boost DC-to-DC converter, respectively. Since the converters shown in FIG. 1 and FIG. 2 have simple topologies and easy modulation manners, they are widely used. However, when they are operated in a continuous conduction mode (CCM), the switching component is hard switching when it is turned on and turned off. As shown in FIG. 3, which shows a waveform of operating in the CCM of the conventional buck converter shown in FIG. 1. In the CCM, when the switch is turned on or turned off, there will be switching loss and the switch needs to withstand higher switching stress. In order to improve these problems, therefore, the soft-switching circuit is usually used or the operation modes are adjusted/changed. For example, the operation mode is changed from the CCM to a discontinuous conduction mode (DCM), or to a critical conduction mode (CRM) shown in FIG. 4 so that the switch is turned on at a zero-current condition.

In the hard-switching operation, the efficiency is significantly affected by the switching loss of the switching component and the reverse recovery loss of the diode so that the switching frequency of the switch is also restricted. Therefore, the power density is unable to increase. In order to solve this problem, the CRM shown in FIG. 4 is used to reduce the switching loss caused by instantaneously turning on the switch. However, the disadvantage is that the switching frequency needs to be adjusted with the load, and the control is more difficult. Further, compared with the CCM, the input current changes greatly, and the requirements for the front-stage and rear-stage filters are higher. The peak current value of the switch and the turned-off current are also larger, resulting in higher voltage and current stress of the switch. Therefore, this control manner is not suitable for higher power applications. In other words, if higher power applications are required, the CCM is still a better solution.

In recent years, many soft-switching circuits based on the CCM have been proposed. As shown in FIG. 5 and FIG. 6, which show a circuit diagram of a conventional buck converter with zero-voltage switching and a circuit diagram of a conventional boost converter with zero-voltage switching, respectively. The principle thereof is to use an additional capacitor Cs, an additional inductor Ls, and an additional switch Ss to produce a current source on the inductor Ls. The reverse diode is turned on before the main switch is turned on so as to achieve zero voltage switching, thereby implementing the target of almost zero turning-on switching loss. However, these circuit topologies require additional switches, inductors, and capacitors, and therefore the increase of passive components has a great impact on the circuit volume and increases circuit complexity and cost.

Accordingly, the present disclosure provides a soft-switching power converter, and more particularly to a soft-switching power converter with an inductive coupled unit can implement a zero-voltage switching operation or a zero-current switching operation to solve the existing technical problems and bottlenecks.

SUMMARY

An object of the present disclosure is to provide a soft-switching power converter to solve the existing technical problems and bottlenecks.

In order to achieve the above-mentioned object, the soft-switching power converter includes a main switch, an energy-releasing switch, and an inductive coupled unit. The main switch is a controllable switch. The energy-releasing switch is coupled to the main switch. The inductive coupled unit is coupled to the main switch and the energy-releasing switch. The inductive coupled unit includes a first inductance, and a second inductance, and an auxiliary switch unit. The second inductance is coupled to the first inductance. The auxiliary switch unit is coupled to the second inductance to form a closed loop. The main switch and the energy-releasing switch are alternately turned on and turned off, and the auxiliary switch unit is controlled to start turning on before the main switch is turned on so as to provide at least one current path.

Accordingly, the zero-voltage switching and the zero-current switching can be easily implemented by collocating the auxiliary switch unit with the inductive coupled unit, which is formed by winding the coupling coil on the main inductance or designing the main inductance in a tapped coupling manner, no additional passive component is used to significantly reduce the circuit volume and increase efficiency and power density, and this circuit uses a coil coupling manner with the function of electrical isolation, which can further simplify the design of the drive circuit for switches.

Another object of the present disclosure is to provide a soft-switching power converter to solve the existing technical problems and bottlenecks.

In order to achieve the above-mentioned object, the soft-switching power converter includes a first switch, a second switch, and an inductive coupled unit. The second switch is coupled to the first switch at a common-connected node. The inductive coupled unit has a first end and a second end, and the first end is coupled to the common-connected node. The inductive coupled unit includes a first inductance, a second inductance, and an auxiliary switch unit. The second inductance is coupled to the first inductance. The auxiliary switch unit is coupled to the second inductance to form a closed loop. In one cycle period, the first switch and the second switch are alternately turned on and turned off, and the auxiliary switch unit is controlled to start turning on before the first switch is turned on so as to provide at least one current path.

Accordingly, the zero-voltage switching and the zero-current switching can be easily implemented by collocating the auxiliary switch unit with the inductive coupled unit, which is formed by winding the coupling coil on the main inductance or designing the main inductance in a tapped coupling manner, no additional passive component is used to significantly reduce the circuit volume and increase efficiency and power density, and this circuit uses a coil coupling manner with the function of electrical isolation, which can further simplify the design of the drive circuit for switches.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
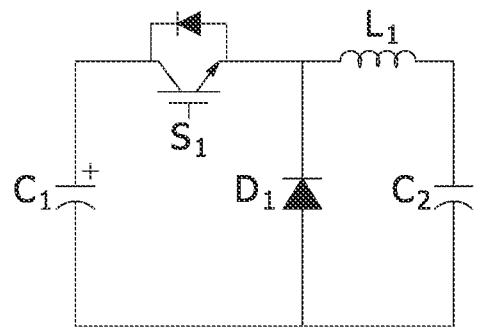
FIG. 1 is a circuit diagram of a conventional buck DC-to-DC converter.
Figure 2:
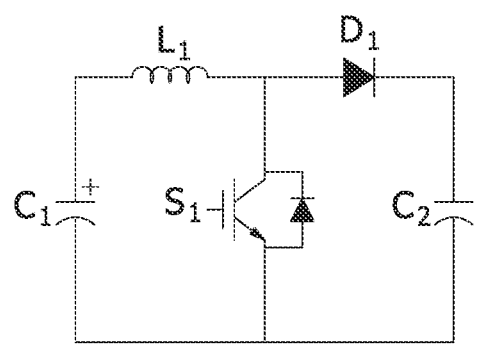
FIG. 2 is a circuit diagram of a conventional boost DC-to-DC converter.
Figure 3:
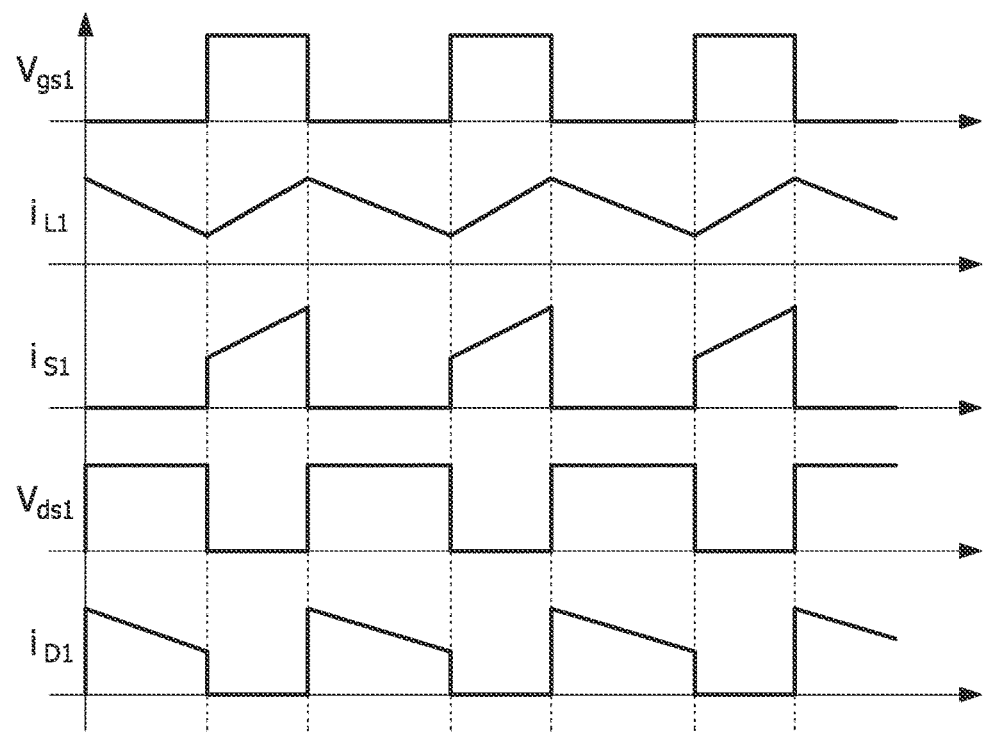
FIG. 3 is a waveform of operating in a continuous conduction mode of the conventional buck converter.
Figure 4:
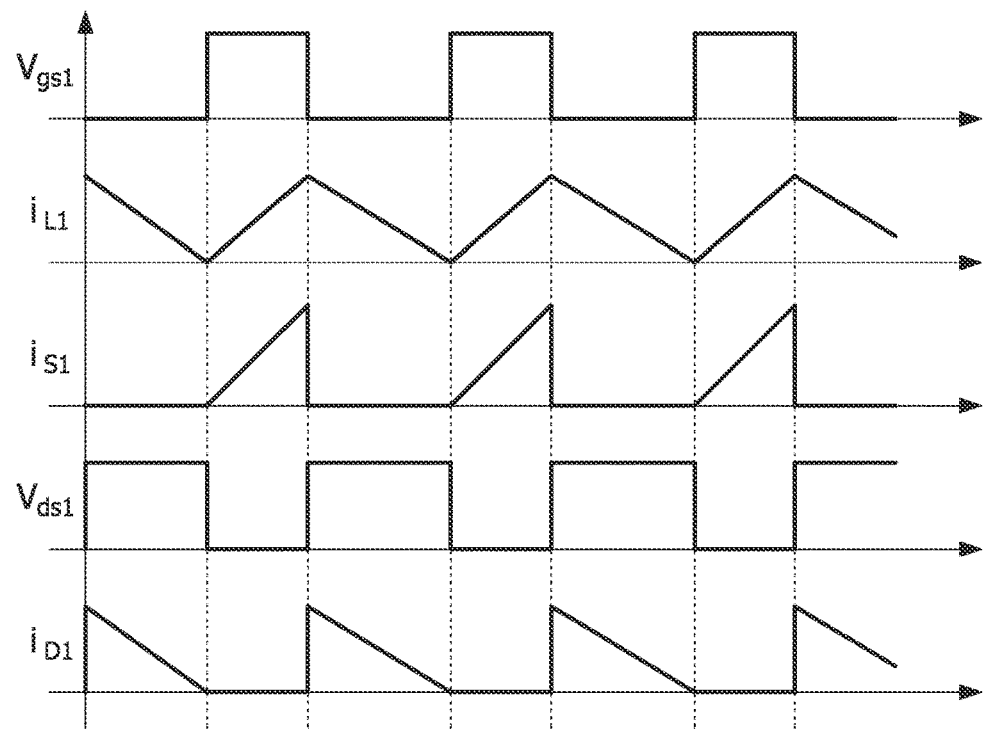
FIG. 4 is a waveform of operating in a critical conduction mode of the conventional buck converter.
Figure 5:
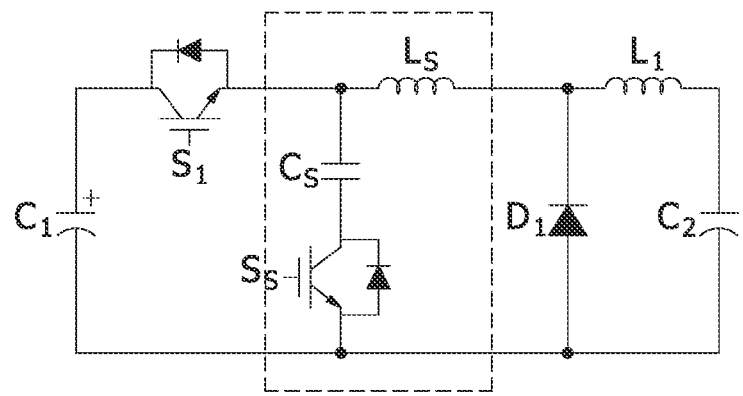
FIG. 5 is a circuit diagram of a conventional buck converter with zero-voltage switching.
Figure 6:
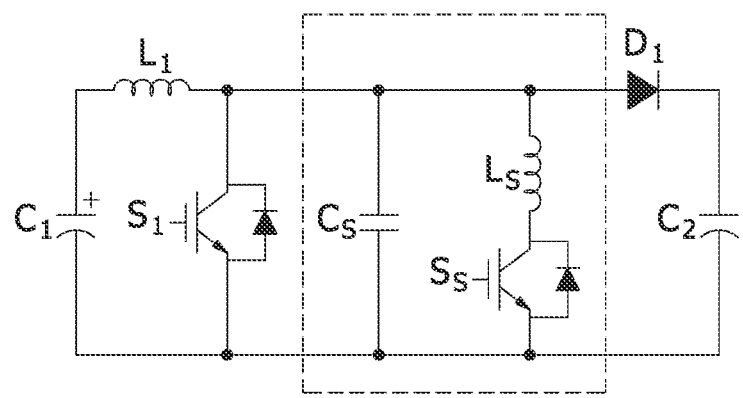
FIG. 6 is a circuit diagram of a conventional boost converter with zero-voltage switching.

Reference will now be made to the drawing figures to describe the present disclosure in detail. It will be understood that the drawing figures and exemplified embodiments of present disclosure are not limited to the details thereof.

The core technology of the soft-switching power converter proposed in the present disclosure is to use an inductive coupled unit to implement zero-voltage switching operation or zero-current switching operation of the soft-switching power converter. The inductive coupled unit includes a first inductance, a second inductance, and au auxiliary switch unit. The second inductance is coupled to the first inductance, and the auxiliary switch unit is coupled to the second inductance to form a closed loop.

Figure 7A:
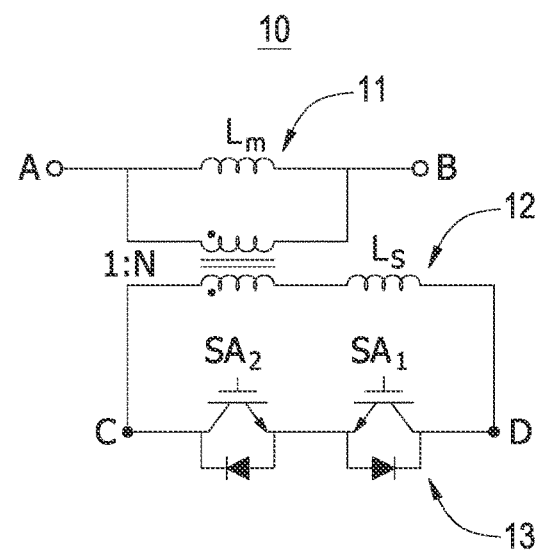
FIG. 7A is a circuit diagram of an inductive coupled unit according to a first embodiment of the present disclosure.
Figure 7B:
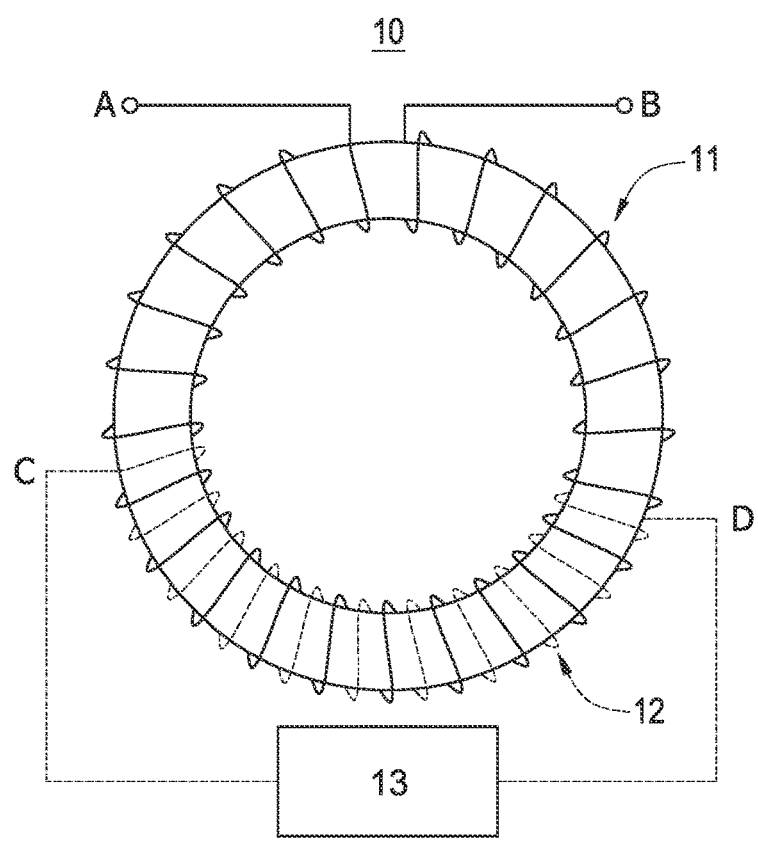
FIG. 7B is a schematic diagram of the circuit component shown in FIG. 7A.

Please refer to FIG. 7A and FIG. 7B, which show a circuit diagram of an inductive coupled unit according to a first embodiment of the present disclosure and a schematic diagram of the circuit component shown in FIG. 7A, respectively. In this embodiment, the inductive coupled unit 10 includes a coupled inductance composed of a main inductance 11 (or indicated by a magnetizing inductance Lm) and an auxiliary inductance 12 (or indicated by a leakage inductance Ls) and an auxiliary switch unit 13. The principle of the coupled inductance can be regarded as the principle of the coupled transformer, that is, it is to wind the auxiliary coil (i.e., the auxiliary inductance 12) on the main inductance 11, which is implemented by the iron core and the main coil wound on it) to achieve the coupling effect. A coil turns ratio between the main inductance 11 and the auxiliary inductance 12 is 1:N. The auxiliary switch unit 13 includes at least one auxiliary switch which is a controllable switch to provide at least one current path, the detailed description will be made as follows.

As shown in FIG. 7A, the first inductance is the main inductance 11 having a first couple end A and a second couple end B, and the second inductance is the auxiliary inductance 12 having couple ends C, D. The first couple end A and the second couple end B of the first inductance may be coupled to two ends of connecting the inductor in the conventional power converter to replace the conventional inductor. The auxiliary switch unit 13 is coupled between the couple ends C, D of the auxiliary inductance 12 to form the closed loop. Therefore, in the application of the power converter, the coupled inductance replaces the additional inductor and the additional capacitor. Therefore, no additional passive component is used to significantly reduce the circuit volume and increase efficiency and power density, and this circuit uses a coil coupling manner with the function of electrical isolation, which can further simplify the design of the drive circuit for switches.

As shown in FIG. 7A, the selection of the auxiliary switch unit 13 may be based on the type or application of the power converter. If the inductive coupled unit 10 is in a bidirectional current operation, for example, is applied to a power converter that two current paths with opposite currents flowing through the inductance thereof are provided, the auxiliary switch unit 13 includes two auxiliary switches, which are controllable switches, having a first transistor switch $SA_1$ and a second transistor switch $SA_2$. In this embodiment, the first transistor switch $SA_1$ and the second transistor switch $SA_2$ may be, but not limited to, composed of insulated gate bipolar transistors (IGBTs) in parallel with diodes, or metal-oxide-semiconductor field-effect transistors (MOSFETs). An emitter of the second transistor switch $SA_2$ is coupled to an emitter of the first transistor switch $SA_1$ in series to form a series-connected structure. The series-connected structure is coupled to the couple end C of the second inductance (i.e., the auxiliary inductance 12 in this embodiment) through a collector of the second transistor switch $SA_2$ and is coupled to the couple end D of the second inductance through a collector of the first transistor switch $SA_1$ to form the closed loop. Through the closed loop, the energy stored in the inductance is internally freewheeling through switches without being transferred to external circuits.

Incidentally, if the inductive coupled unit 10 operates in a unidirectional (single-directional) current, for example, applied to a boost converter or a buck converter, the current flowing through the inductance is only in one direction, one of the controllable switches, i.e., the first transistor switch $SA_1$ and a second transistor switch $SA_2$ (of the auxiliary switch unit 13) can be replaced with a diode without affecting the circuit operation, that is, one is a controllable auxiliary switch and the other is an auxiliary diode connected to the auxiliary switch in series. At this condition, the auxiliary switch unit 13 provides one current path for turning-on and turning-off operation. If the inductive coupled unit 10 operates in a bidirectional current, the auxiliary switches of the auxiliary switch unit 13 should be both controllable switches connected in series to provide two current paths with opposite currents under bidirectional current operation. At this condition, the auxiliary switch unit 13 provides two current paths for turning-on and turning-off operation.

Figure 8A:
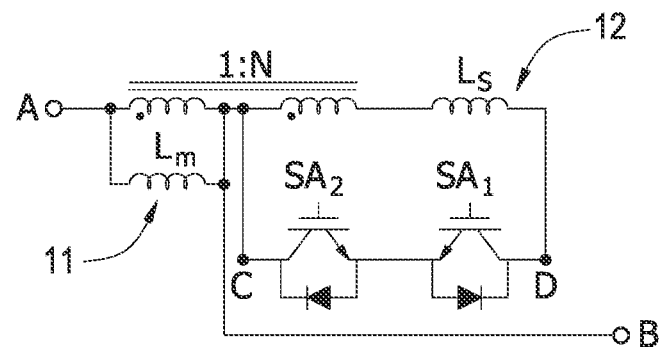
FIG. 8A is a circuit diagram of the inductive coupled unit according to a second embodiment of the present disclosure.
Figure 8B:
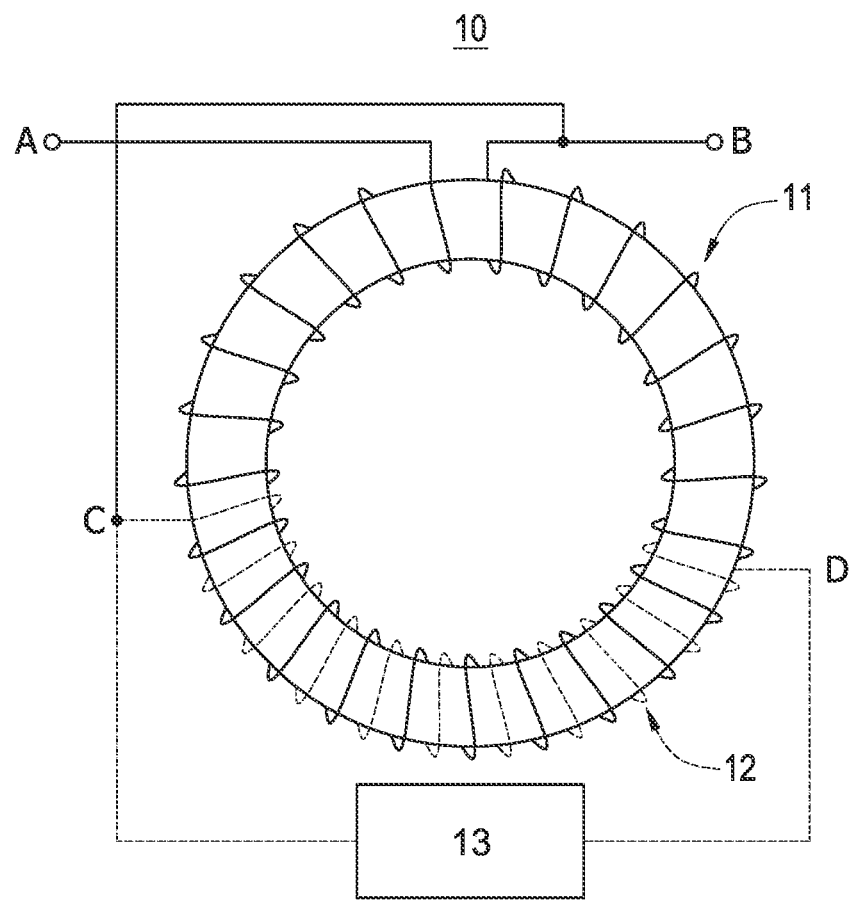
FIG. 8B is a schematic diagram of the circuit component shown in FIG. 8A.

Please refer to FIG. 8A and FIG. 8B, which shows a circuit diagram of the inductive coupled unit according to a second embodiment of the present disclosure and a schematic diagram of the circuit component shown in FIG. 8A. Compared with the first embodiment shown in FIG. 7A and FIG. 7B, the couple end C of the auxiliary inductance 12 (i.e., the second inductance) is commonly connected to the second couple end B of the main inductance 11 (i.e., the first inductance) to form the circuit structure of the second embodiment. Similarly, the auxiliary switch unit 13 is coupled between the couple ends C, D of the auxiliary inductance 12 to form the closed loop. Similarly, the auxiliary switch unit 13 includes two auxiliary switches, which are controllable switches, having a first transistor switch $SA_1$ and a second transistor switch $SA_2$. In this embodiment, the first transistor switch $SA_1$ and the second transistor switch $SA_2$ are IGBTs in parallel with diodes. An emitter of the second transistor switch $SA_2$ is coupled to an emitter of the first transistor switch $SA_1$ in series to form a series-connected structure. The series-connected structure is coupled to the couple end C of the second inductance (i.e., the auxiliary inductance 12 in this embodiment) through a collector of the second transistor switch $SA_2$ and is coupled to the couple end D of the second inductance through a collector of the first transistor switch $SA_1$ to form the closed loop.

Figure 9A:
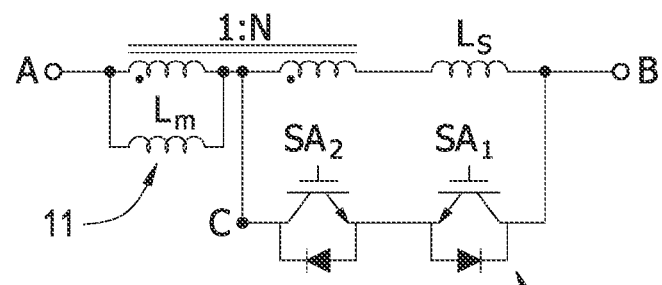
FIG. 9A is a circuit diagram of the inductive coupled unit according to a third embodiment of the present disclosure.
Figure 9B:
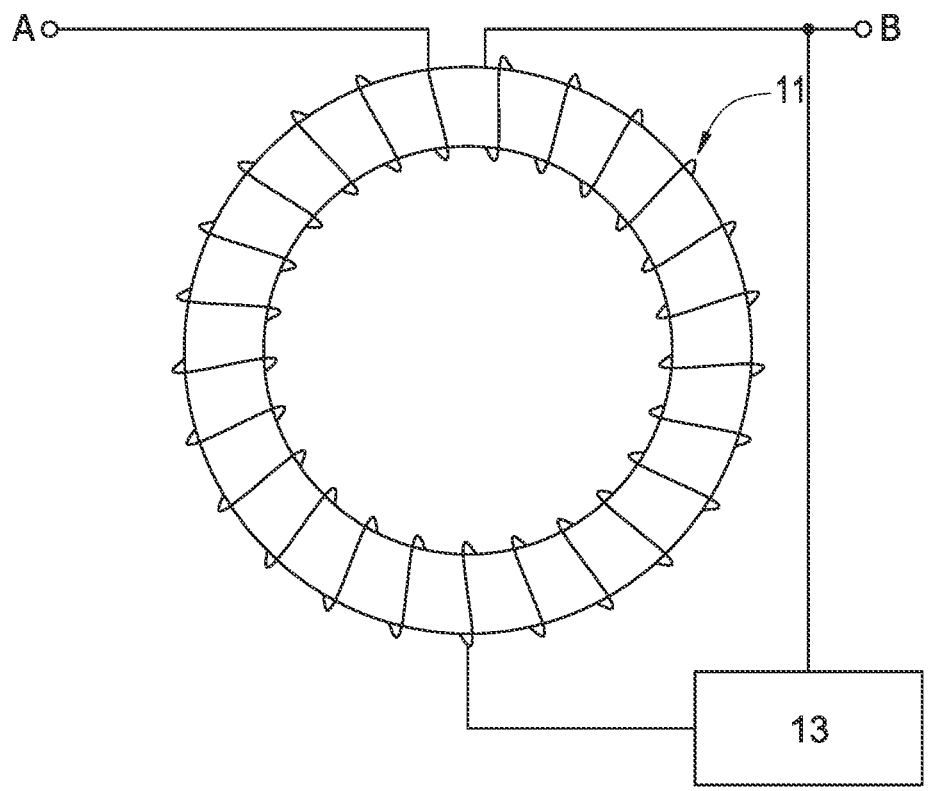
FIG. 9B is a schematic diagram of the circuit component shown in FIG. 9A.

Please refer to FIG. 9A and FIG. 9B, which shows a circuit diagram of the inductive coupled unit according to a third embodiment of the present disclosure and a schematic diagram of the circuit component shown in FIG. 9A. In this embodiment, the soft-switching circuit includes a main inductance 11 and an auxiliary switch unit 13. Specifically, a main coil of the main inductance 11 is in a tapped coupling manner, that is, the main inductance 11 provides a first couple end A and a second couple end B, and one part of the main inductance 11 provides a first inductance correspondingly coupling to couple ends A, C and the other part of the main inductance 11 provides a second inductance correspondingly coupling to the couple ends B, C. In other words, the main inductance 11 is composed of the first inductance and the second inductance. Therefore, the auxiliary switch unit 13 is coupled between the couple ends B, C of the main inductance 11 to form the closed loop. Similarly, the auxiliary switch unit 13 includes two auxiliary switches, which are controllable switches, having a first transistor switch $SA_1$ and a second transistor switch $SA_2$. In this embodiment, the first transistor switch $SA_1$ and the second transistor switch $SA_2$ are IGBTs in parallel with diodes. An emitter of the second transistor switch $SA_2$ is coupled to an emitter of the first transistor switch $SA_1$ in series to form a series-connected structure. The series-connected structure is coupled to the couple end C of the main inductance 11 through a collector of the second transistor switch $SA_2$ and is coupled to the couple end B of the main inductance 11 through a collector of the first transistor switch $SA_1$ to form the closed loop.

Figure 10:
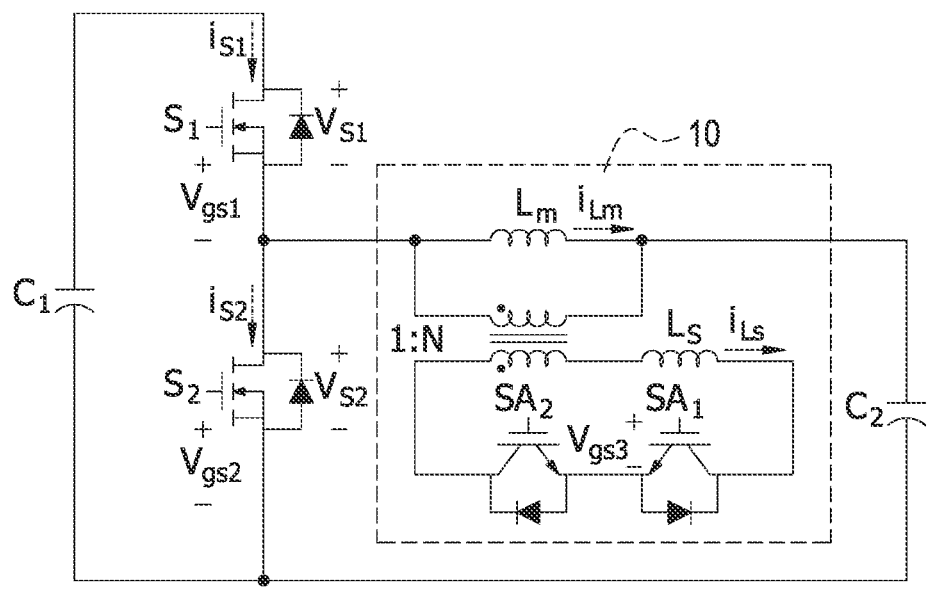
FIG. 10 is a circuit diagram of using the inductive coupled unit shown in FIG. 7A in a buck converter according to the present disclosure.
Figure 11A:
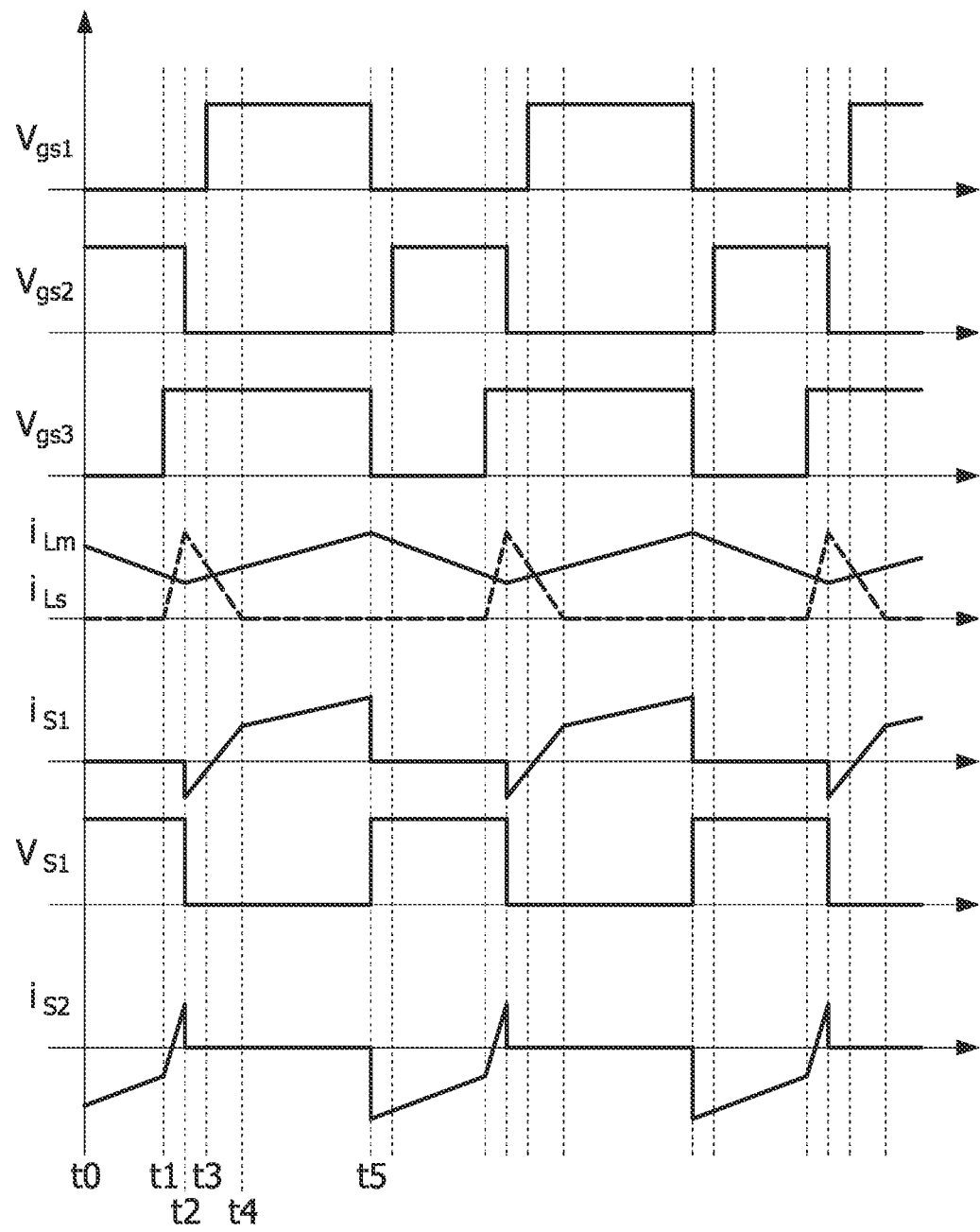
FIG. 11A is a waveform of a zero-voltage switching control corresponding to FIG. 10.
Figure 12:
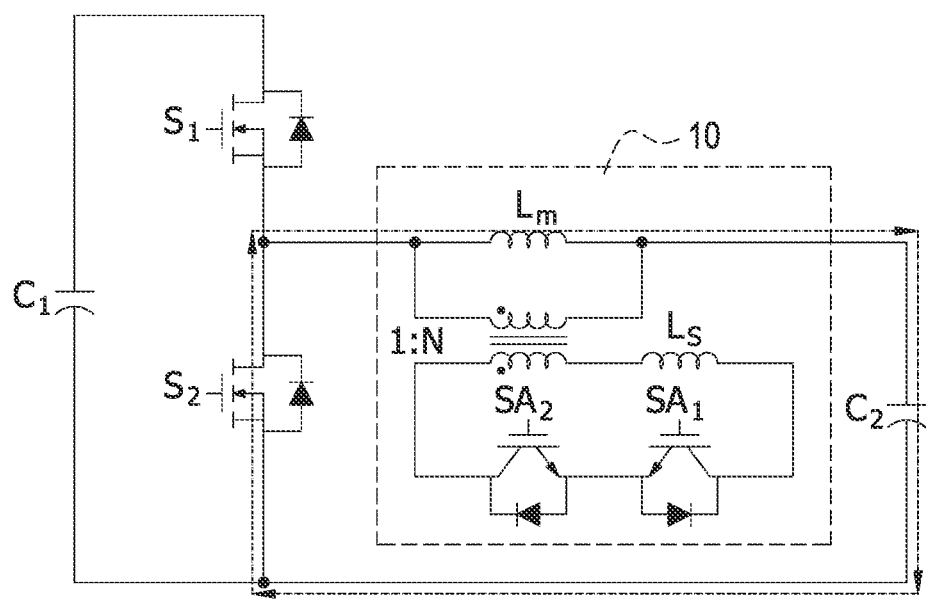
FIG. 12 is a circuit diagram with current paths operating during time t0 to time t1 in FIG. 11A.
Figure 13A:
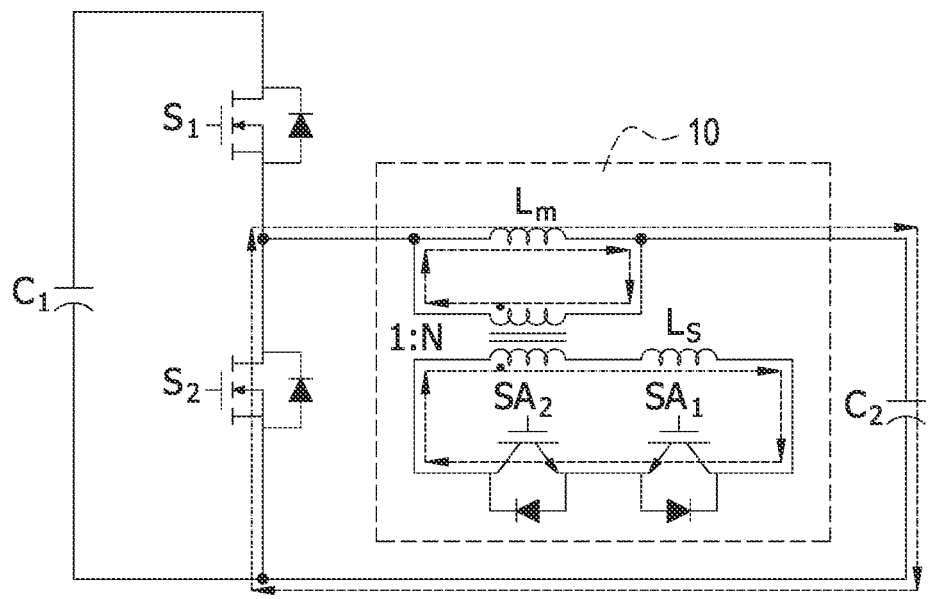
FIG. 13A and FIG. 13B are circuit diagrams with current paths operating during time t1 to time t2 in FIG. 11A.
Figure 13B:
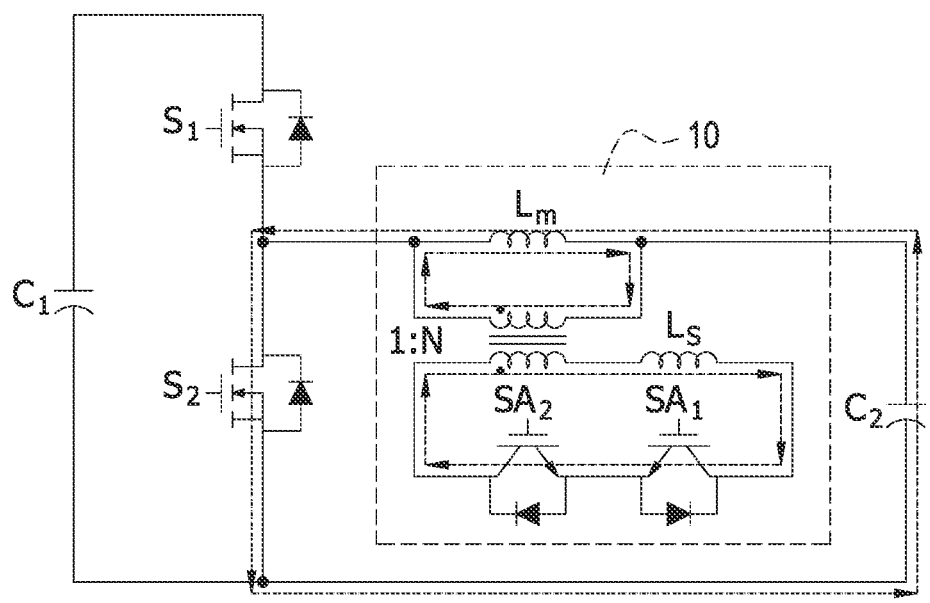
Figure 14:
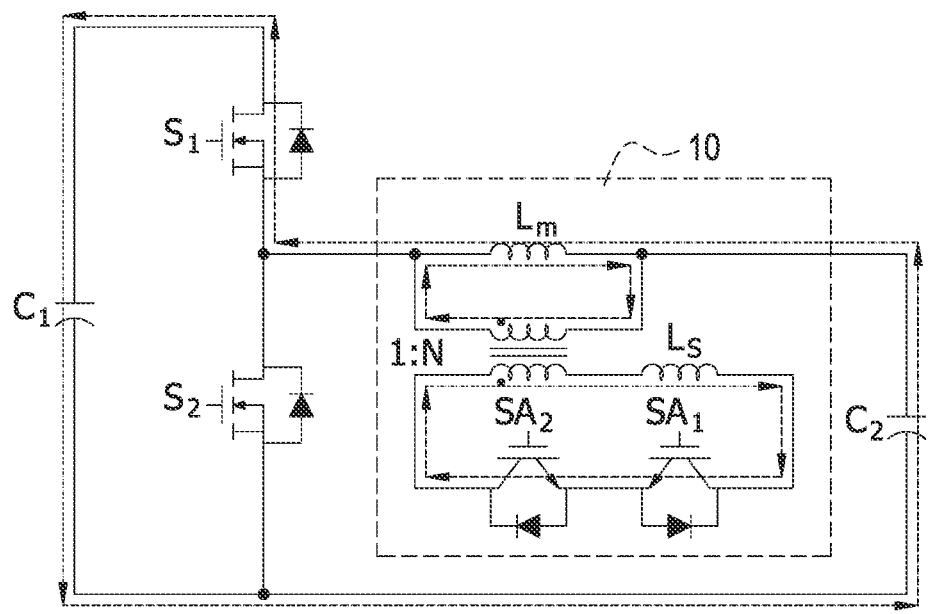
FIG. 14 is a circuit diagram with current paths operating during time t2 to time t3 in FIG. 11A.
Figure 15A:
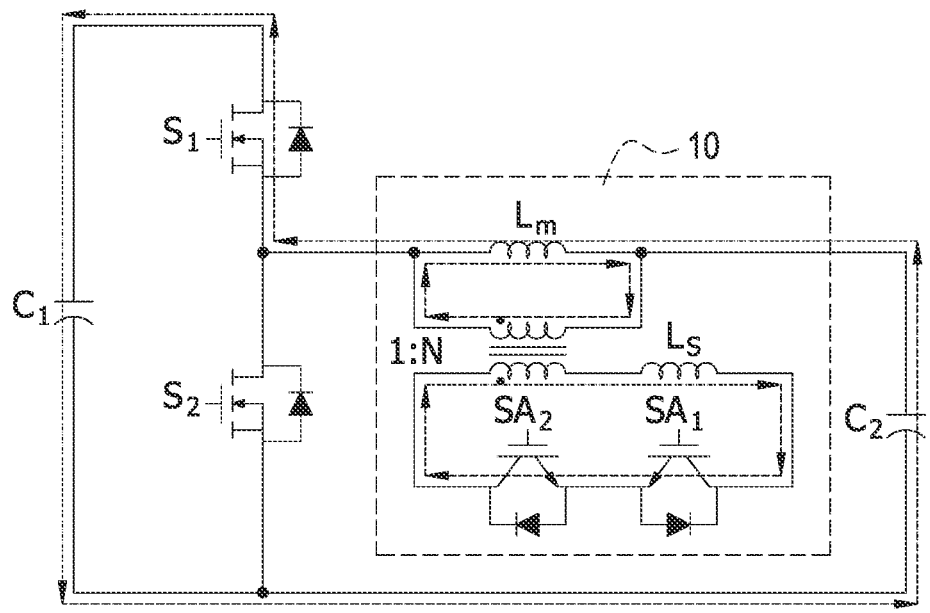
FIG. 15A and FIG. 15B are circuit diagrams with current paths operating during time t3 to time t4 in FIG. 11A.
Figure 15B:
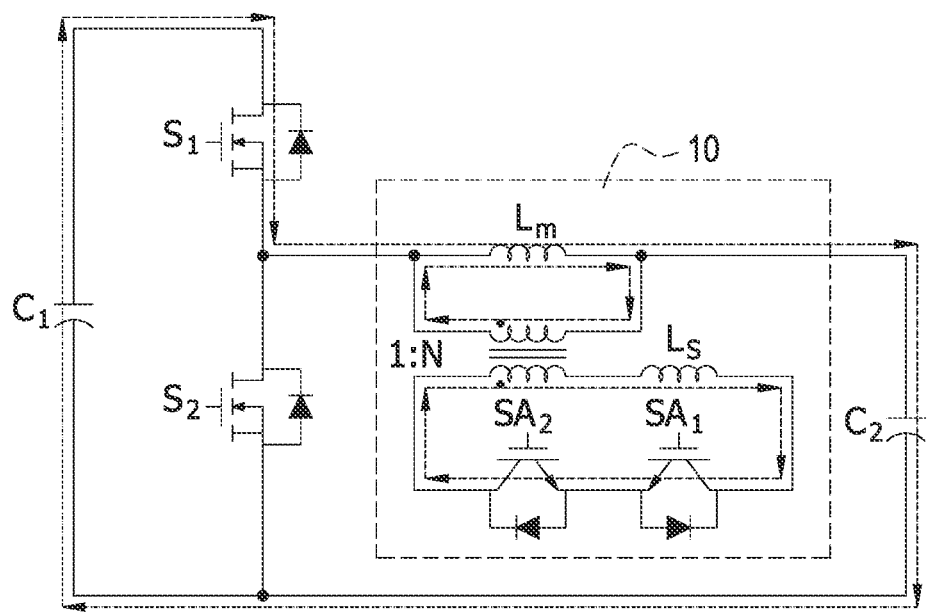
Figure 16:
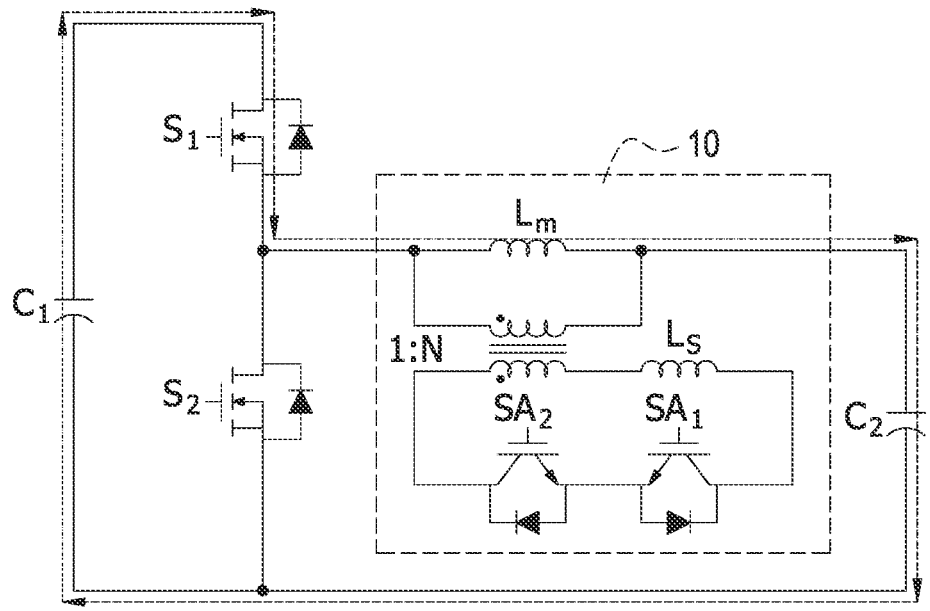
FIG. 16 is a circuit diagram with current paths operating during time t4 to time t5 in FIG. 11A.

Please refer to FIG. 10 and FIG. 11A, which show a circuit diagram of using the inductive coupled unit shown in FIG. 7A in a buck converter according to the present disclosure and a waveform of a zero-voltage switching control corresponding to FIG. 10. Please also refer to FIG. 12 to FIG. 16. FIG. 12 shows a circuit diagram with current paths operating during time t0 to time t1 in FIG. 11A. FIG. 13A and FIG. 13B show circuit diagrams with current paths operating during time t1 to time t2 in FIG. 11A. FIG. 14 shows a circuit diagram with current paths operating during time t2 to time t3 in FIG. 11A. FIG. 15A and FIG. 15B show circuit diagrams with current paths operating during time t3 to time t4 in FIG. 11A. FIG. 16 shows a circuit diagram with current paths operating during time t4 to time t5 in FIG. 11A.

As mentioned above, since the inductive coupled unit 10 is applied to the buck converter in the single-directional current operation, i.e., the current flowing through the inductance is single-directional, the soft-switching power converter includes a main switch $S_1$ which is a controllable switch, an energy-releasing switch $S_2$ which may be a synchronous rectifier switch or a diode, and an inductive coupled unit 10. For the convenience of description, the auxiliary switch unit 13 takes two controllable switches (a first transistor switch $SA_1$ and a second transistor switch $SA_2$) as an example. In the application of the buck converter, the second transistor switch $SA_2$ may be replaced by a diode without affecting the circuit operation. However, if the zero-voltage switching control is to be used, the energy-releasing switch $S_2$ should be the controllable switch (i.e., the synchronous rectifier switch); if the zero-current switching control is to be used, the energy-releasing switch $S_2$ may be the controllable switch (i.e., the synchronous rectifier switch) or the diode. Incidentally, the main switch of the present disclosure is a (at least one) switch that is controlled to be turned on to store energy for the inductor of the switching power converter; the energy-releasing switch is a switch that provides a freewheeling current path when the main switch is not turned on. Take the buck converter shown in FIG. 10 as an example, the capacitor $C_1$ is the input (capacitor) and the capacitor $C_2$ is the output (capacitor), and the main switch $S_1$ is turned on to store energy in the inductance, and the freewheeling current of the inductor flows through the energy-releasing switch $S_2$ when the main switch $S_1$ is turned off.

As shown in FIG. 11A, which shows a waveform of a zero-voltage switching control corresponding to FIG. 10. During time t0 to time t1 (corresponding to FIG. 12), the main switch $S_1$ is turned off and the main inductance 11 (or indicated by a magnetizing inductance Lm) releases energy to the output capacitor $C_2$ through the energy-releasing switch $S_2$, and therefore the magnetizing inductance current $i_{Lm}$ gradually decreases. At time t1, the energy-releasing switch $S_2$ is still turned on and the voltage Vgs3 changes/transits to the high voltage level to control turning on the first transistor switch $SA_1$, namely the auxiliary switch. At this condition, as shown in FIG. 13A, the output capacitor $C_2$ stores energy to the auxiliary inductance (or indicated by a leakage inductance Ls) through the coil coupling manner, and therefore the leakage inductance current $i_{Ls}$ starts to increase. Correspondingly, the magnetizing inductance current $i_{Lm}$ continuously decreases. Accordingly, the auxiliary switch (namely the first transistor switch $SA_1$) is turned on before the energy-releasing switch $S_2$ is turned off so that the current flowing through the closed loop (namely the leakage inductance current $i_{Ls}$) increases.

When the leakage inductance current $i_{Ls}$ increases to be greater than the magnetizing inductance current $i_{Lm}/N$ (for the convenience of explanation, the coil turns ratio N here is assumed to be 1) shown in FIG. 13B, the current $i_{S2}$ flowing through the energy-releasing switch $S_2$ changes from a negative value to a positive value. This means that the leakage inductance current $i_{Ls}$ has increased enough to reverse the current $i_{S2}$, and the freewheeling of the magnetizing inductance current $i_{Lm}$ can be maintained. At time t2 shown in FIG. 11A, the energy-releasing switch $S_2$ is turned off. As shown in FIG. 14, the current $i_{S2}$ flowing through the energy-releasing switch $S_2$ will flow to the body diode of the main switch $S_1$. At this condition, the voltage $V_{S1}$ across the main switch $S_1$ will decrease to zero, and the leakage inductance current $i_{Ls}$ will also start to decrease due to the connection to the input voltage. Therefore, at time t3, the main switch $S_1$ can be turned on to achieve the zero-voltage switching of the main switch $S_1$, also refer to FIG. 15A, FIG. 15B, and FIG. 16. Afterward, the main inductance (namely the magnetizing inductance Lm) changes to store energy, and therefore the magnetizing inductance current $i_{Lm}$ gradually increases and the leakage inductance current $i_{Ls}$ continuously decreases to zero.

Incidentally, at time t4, the leakage inductance current $i_{Ls}$ decreases to zero. Since the second transistor switch $SA_2$ is not turned on and the parallel-connected diode blocks the current in the opposite direction, the leakage inductance current $i_{Ls}$ will not change the current direction to avoid unnecessary current in the closed loop during the turned-on time/period of the main switch $S_1$. In other words, the second transistor switch $SA_2$ may be replaced with the diode, and the first transistor switch $SA_1$ is turned on before the main switch $S_1$ is turned on so that the auxiliary switch unit 13 provides a single-directional current path to turn on the main switch $S_1$ at zero voltage. In addition, in the zero-voltage switching control, since the current $i_{S2}$ will be reversed, the energy-releasing switch $S_2$ should use a controllable switch (synchronous rectifier switch) instead of the diode.

Incidentally, take the inductive coupled unit 10 applied to a boost converter as an example, the capacitor $C_2$ shown in FIG. 10 becomes the input (capacitor) and the capacitor $C_1$ becomes the output (capacitor); the role of the main switch $S_1$ and that of the energy-releasing switch $S_2$ will be changed, and the role of the first transistor switch $SA_1$ and that of the second transistor switch $SA_2$ will be changed. Therefore, it can also implement the zero-voltage switching of the main switch $S_2$ in the application of boost converter. Since the inductive coupled unit 10 can be applied to the buck converter and the boost converter with different current directions, the inductive coupled unit 10 can be also applied to power converters which are in a bidirectional current operation, such as but not limited to, the full-bridge inverter, the half-bridge inverter, the T-type inverter, and so on. Therefore, when the inductive coupled unit 10 is applied to the power converter with bidirectional current operation, both the first transistor switch $SA_1$ and the second transistor switch $SA_2$ should be the controllable switches or be designed as a full-bridge circuit structure (explained later) to implement that one is turned on and the other is turned off, thereby providing two current paths with opposite currents under bidirectional current operation.

Figure 11B:
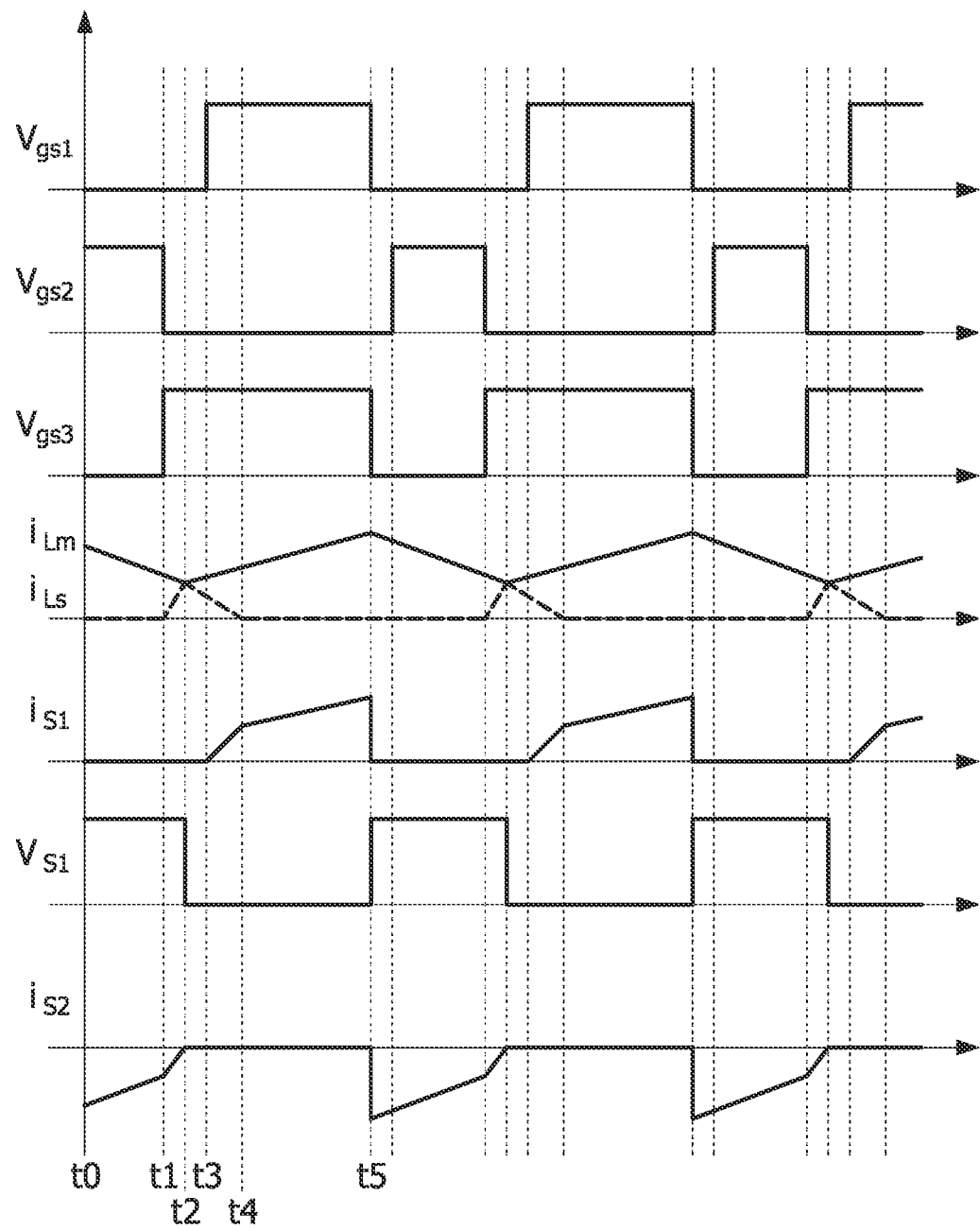
FIG. 11B is a waveform of a zero-current switching control corresponding to FIG. 10.
Figure 17:
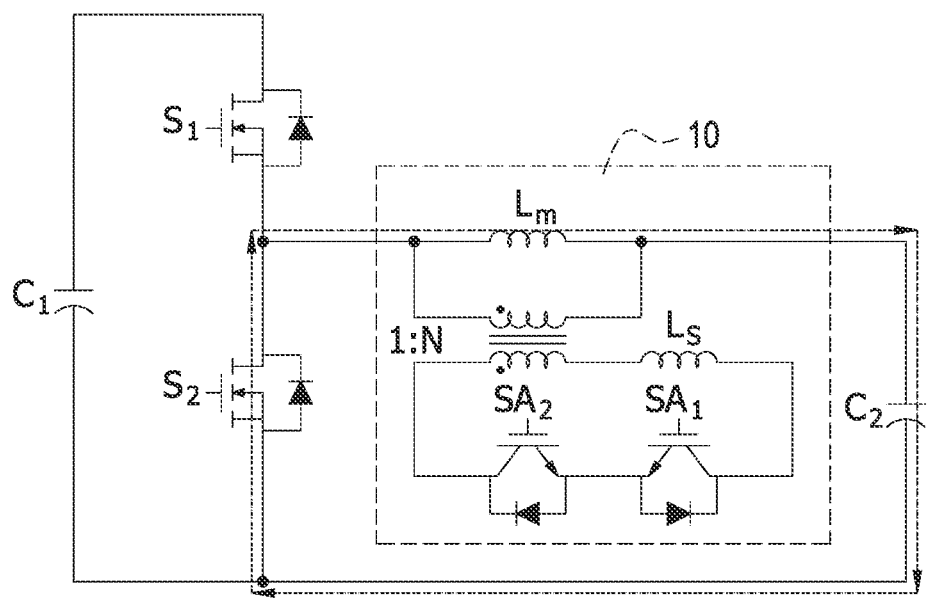
FIG. 17 is a circuit diagram with current paths operating during time t0 to time t1 in FIG. 11B.
Figure 18:
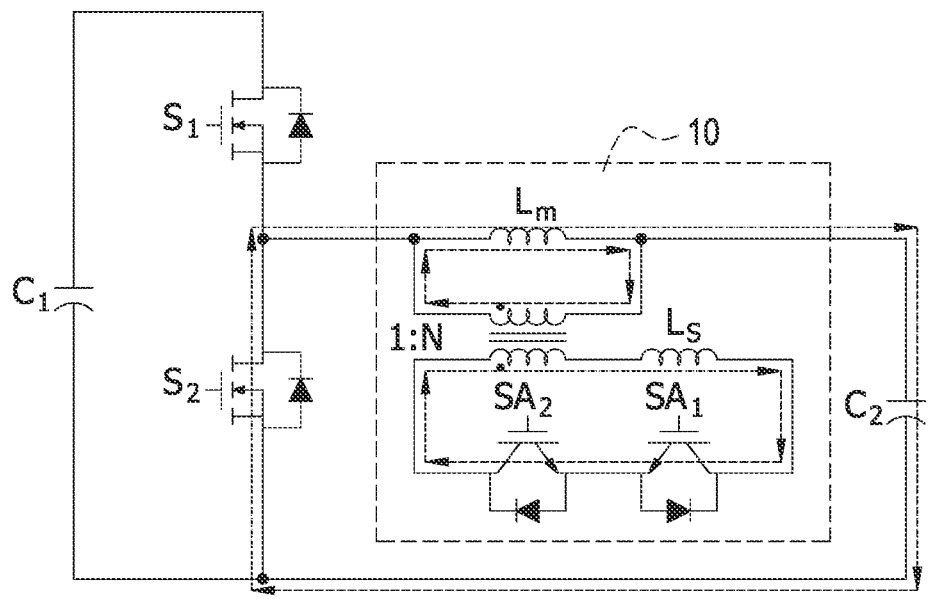
FIG. 18 is a circuit diagram with current paths operating during time t1 to time t2 in FIG. 11B.
Figure 19:
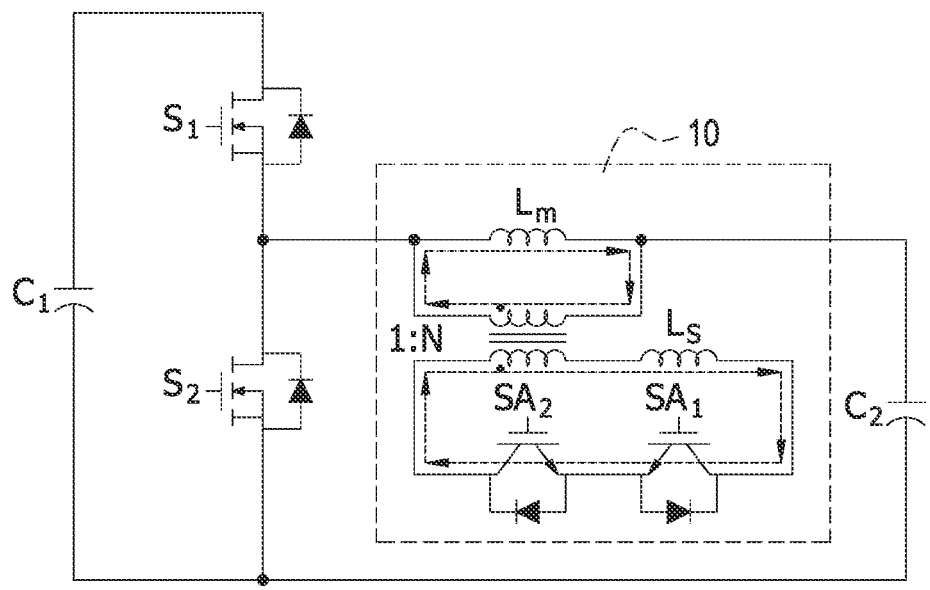
FIG. 19 is a circuit diagram with current paths operating during time t2 to time t3 in FIG. 11B.
Figure 20:
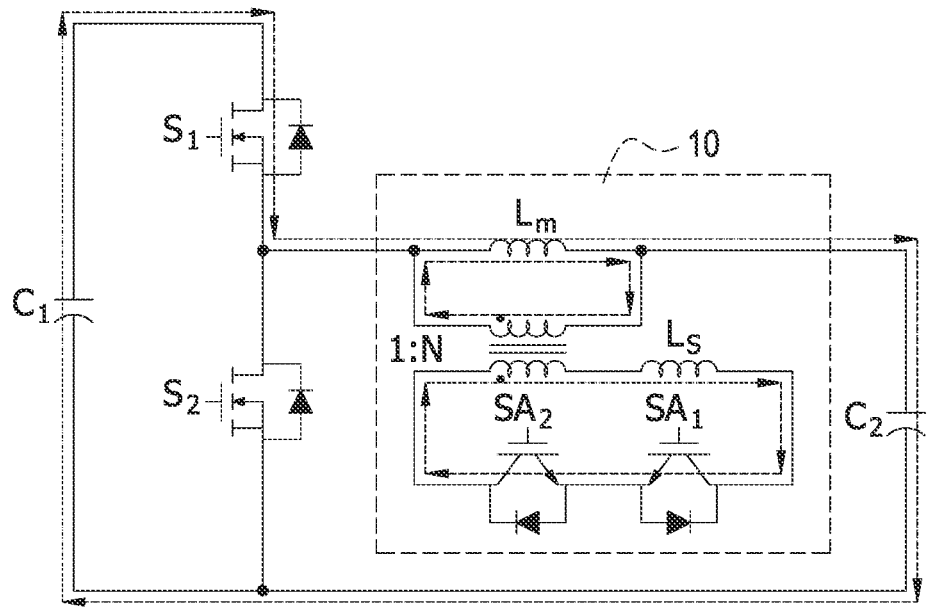
FIG. 20 is a circuit diagram with current paths operating during time t3 to time t4 in FIG. 11B.
Figure 21:
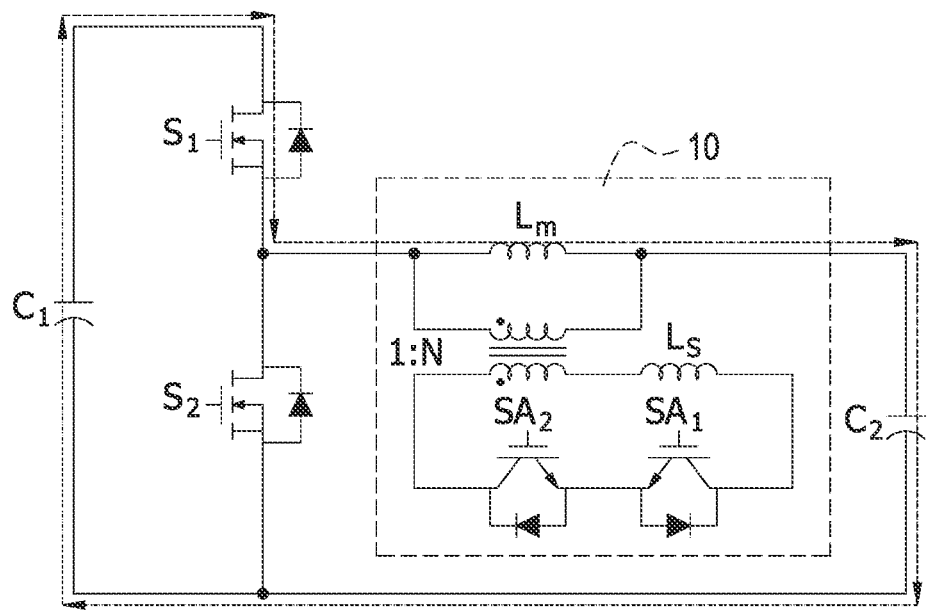
FIG. 21 is a circuit diagram with current paths operating during time t4 to time t5 in FIG. 11B.

Please refer to FIG. 10 and FIG. 11B, which show a circuit diagram of using the inductive coupled unit shown in FIG. 7A in a buck converter according to the present disclosure and a waveform of a zero-current switching control corresponding to FIG. 10. Please also refer to FIG. 17 to FIG. 21. FIG. 17 shows a circuit diagram with current paths operating during time t0 to time t1 in FIG. 11B. FIG. 18 shows a circuit diagram with current paths operating during time t1 to time t2 in FIG. 11B. FIG. 19 shows a circuit diagram with current paths operating during time t2 to time t3 in FIG. 11B. FIG. 20 shows a circuit diagram with current paths operating during time t3 to time t4 in FIG. 11B. FIG. 21 shows a circuit diagram with current paths operating during time t4 to time t5 in FIG. 11B.

Compared with the zero-voltage switching mode, the difference in the zero-current switching mode is that the auxiliary switch (i.e., the first transistor switch $SA_1$ in this embodiment) of the auxiliary switch unit 13 is turned on after the energy-releasing switch $S_2$ is turned off. As shown in FIG. 11B, during time t0 to time t1 (corresponding to FIG. 17), since the main switch $S_1$ is turned off, the main inductance (namely the magnetizing inductance Lm) releases energy so that the magnetizing inductance current $i_{Lm}$ gradually decreases and the energy-releasing switch $S_2$ is the synchronous rectifier switch. At time t1, the energy-releasing switch $S_2$ is turned off, and then the first transistor switch $SA_1$ (i.e., the auxiliary switch) is turned on. At this condition, as shown in FIG. 18, the output capacitor $C_2$ stores energy to the auxiliary inductance (or indicated by a leakage inductance Ls) through the coil coupling manner, and therefore the leakage inductance current $i_{Ls}$ starts to increase. For the convenience of explanation, the coil turns ratio N here is assumed to be 1. When the increased leakage inductance current $i_{Ls}$ rises to the same magnitude as the decreased magnetizing inductance current $i_{Lm}$ (at time t2 as shown in FIG. 11B), the leakage inductance Ls will no longer store energy since the synchronous rectifier switch $S_2$ is turned off (or the diode is reversely biased if the synchronous rectifier switch $S_2$ is replaced by the diode). At this condition, as shown in FIG. 19, the freewheeling of the magnetizing inductance current $i_{Lm}$ at the auxiliary switch side through the coil coupling manner.

At time t3, as shown in FIG. 20, the main switch $S_1$ is turned on. Since the rise of the current $i_{S1}$ of the main switch $S_1$ is limited by the effect of the leakage inductance Ls, the current rises very slowly (i.e., di/dt is small), and therefore the main switch $S_1$ can achieve almost zero-current switching (ZCS). Incidentally, in the zero-current switching mode, since the first transistor switch $SA_1$ is turned on after the energy-releasing switch $S_2$ is turned off, there is no characteristic that the current $i_{S2}$ reverses in the zero-voltage switching mode. Therefore, in the zero-current switching mode, the energy-releasing switch $S_2$ can be a diode without affecting the circuit operation. Incidentally, take the inductive coupled unit 10 applied to a boost converter as an example, the role of the main switch $S_1$ and that of the energy-releasing switch $S_2$ will be changed, and the role of the first transistor switch $SA_1$ and that of the second transistor switch $SA_2$ will be changed. Therefore, it can also implement the zero-current switching of the main switch $S_2$ in the application of boost converter.

Figure 22:
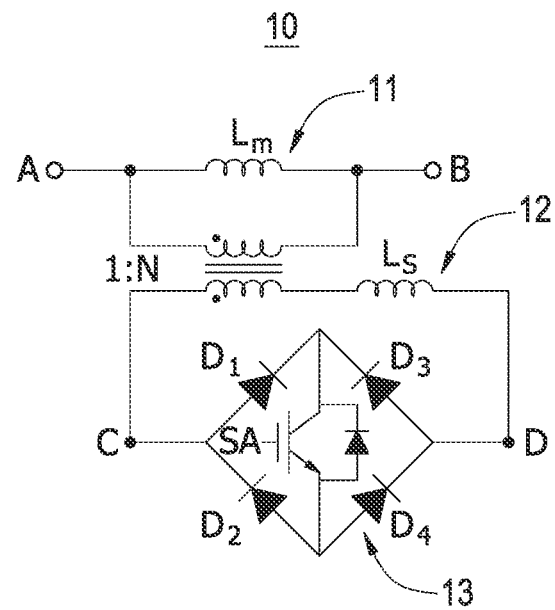
FIG. 22 is a circuit diagram of an auxiliary switch unit according to another embodiment of the present disclosure.

Please refer to FIG. 22, which shows a circuit diagram of the auxiliary switch unit according to another embodiment of the present disclosure. Compared with the auxiliary switch unit 13 shown in FIG. 7A, which is composed of the first transistor switch $SA_1$ and the second transistor switch $SA_2$ coupled in series, the auxiliary switch unit 13 shown in FIG. 22 includes a first diode $D_1$, a second diode $D_2$, a third diode $D_3$, a fourth diode $D_4$, and a transistor switch SA. Specifically, a cathode of the second diode $D_2$ is coupled to an anode of the first diode $D_1$ at a first common-connected node, and the first common-connected node is coupled to the couple end C of the auxiliary inductance 12. A cathode of the fourth diode $D_4$ is coupled to an anode of the third diode $D_3$ at a second common-connected node, and the second common-connected node is coupled to the couple end D of the auxiliary inductance 12. A cathode of the first diode $D_1$ is coupled to a cathode of the third diode $D_3$ at a third common-connected node, and an anode of the second diode $D_2$ is coupled to an anode of the fourth diode $D_4$ at a fourth common-connected node, thereby forming a full-bridge structure to provide two current paths with opposite currents. In this embodiment, the transistor switch SA is, for example but not limited to, an IGBT. A first end (such as the collector) of the transistor switch SA is coupled to the third common-connected node, and a second end (such as the emitter) of the transistor switch SA is coupled to the fourth common-connected node. Therefore, the auxiliary switch unit 13 is coupled to the second inductance (i.e., the auxiliary inductance 12 in this embodiment) to form a closed loop. More, the auxiliary switch unit 13 may be applied to power converters which are in a single-directional current operation or a bidirectional current operation.

Figure 23:
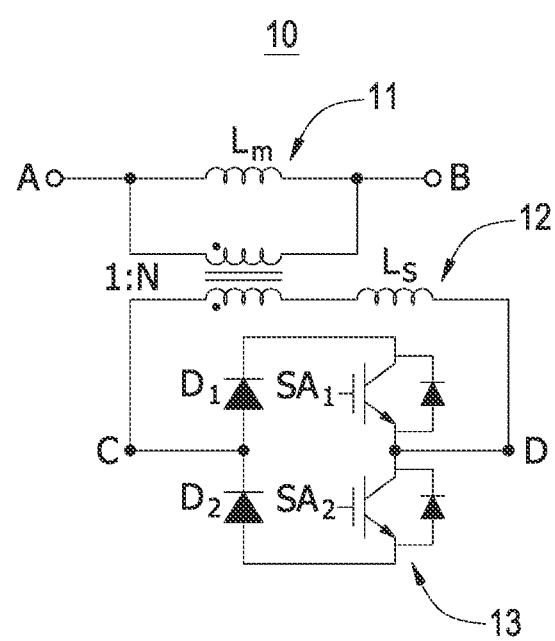
FIG. 23 is a circuit diagram of the auxiliary switch unit according to further another embodiment of the present disclosure.

Please refer to FIG. 23, which shows a circuit diagram of the auxiliary switch unit according to further another embodiment of the present disclosure. The auxiliary switch unit 13 shown in FIG. 23 includes a first diode $D_1$, a second diode $D_2$, a first transistor switch $SA_1$, and a second transistor switch $SA_2$. Specifically, a cathode of the second diode $D_2$ is coupled to an anode of the first diode $D_1$ at a first common-connected node, and the first common-connected node is coupled to the couple end C of the auxiliary inductance 12 to form a full-bridge structure to provide two current paths with opposite currents. In this embodiment, the first transistor switch $SA_1$ and the second transistor switch $SA_2$ are, for example but not limited to, IGBTs. A first end (such as the emitter) of the first transistor switch $SA_1$ is coupled to a second end (such as the collector) of the second transistor switch $SA_2$ at the second common-connected node, and the second common-connected node is coupled to the couple end D of the auxiliary inductance 12. A second end (such as the collector) of the first transistor switch $SA_1$ is coupled to a cathode of the first diode $D_1$, and a first end (such as the emitter) of the second transistor switch $SA_2$ is coupled to an anode of the second diode $D_2$. Therefore, the auxiliary switch unit 13 is coupled to the second inductance (i.e., the auxiliary inductance 12 in this embodiment) to form a closed loop. More, the auxiliary switch unit 13 may be applied to power converters which are in a single-directional current operation or a bidirectional current operation.

Figure 24:
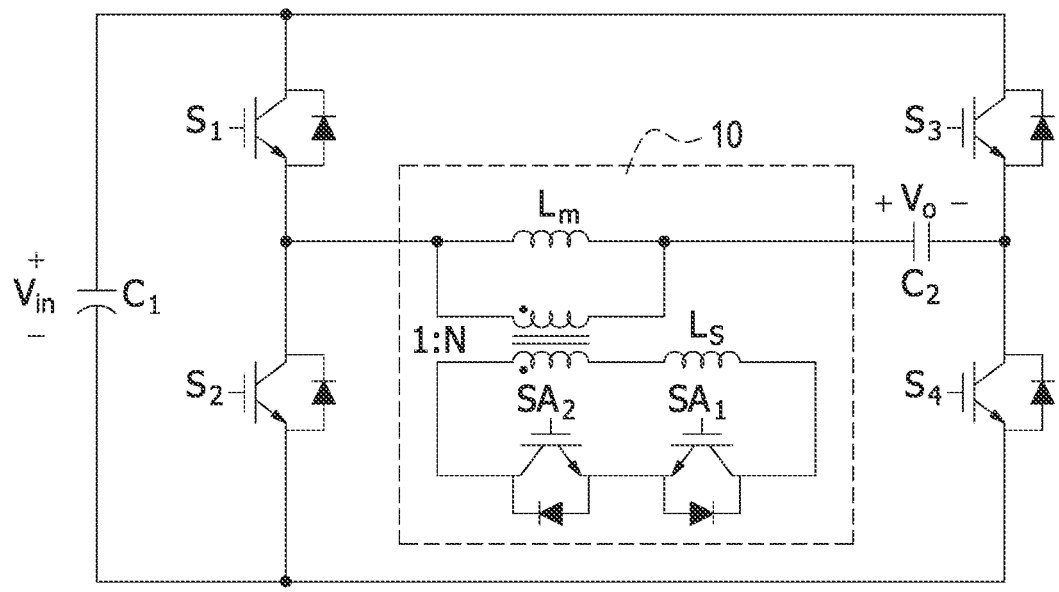
FIG. 24 is a circuit diagram of using the inductive coupled unit shown in FIG. 7A in a full-bridge inverter according to the present disclosure.
Figure 25:
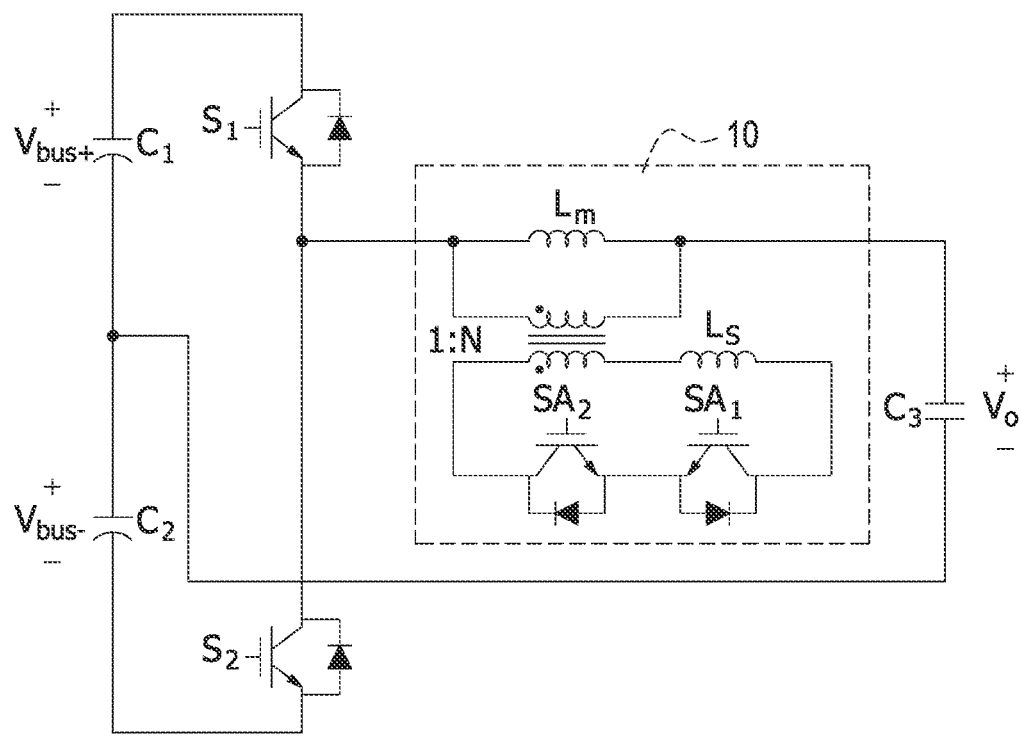
FIG. 25 is a circuit diagram of using the inductive coupled unit shown in FIG. 7A in a half-bridge inverter according to the present disclosure.
Figure 26:
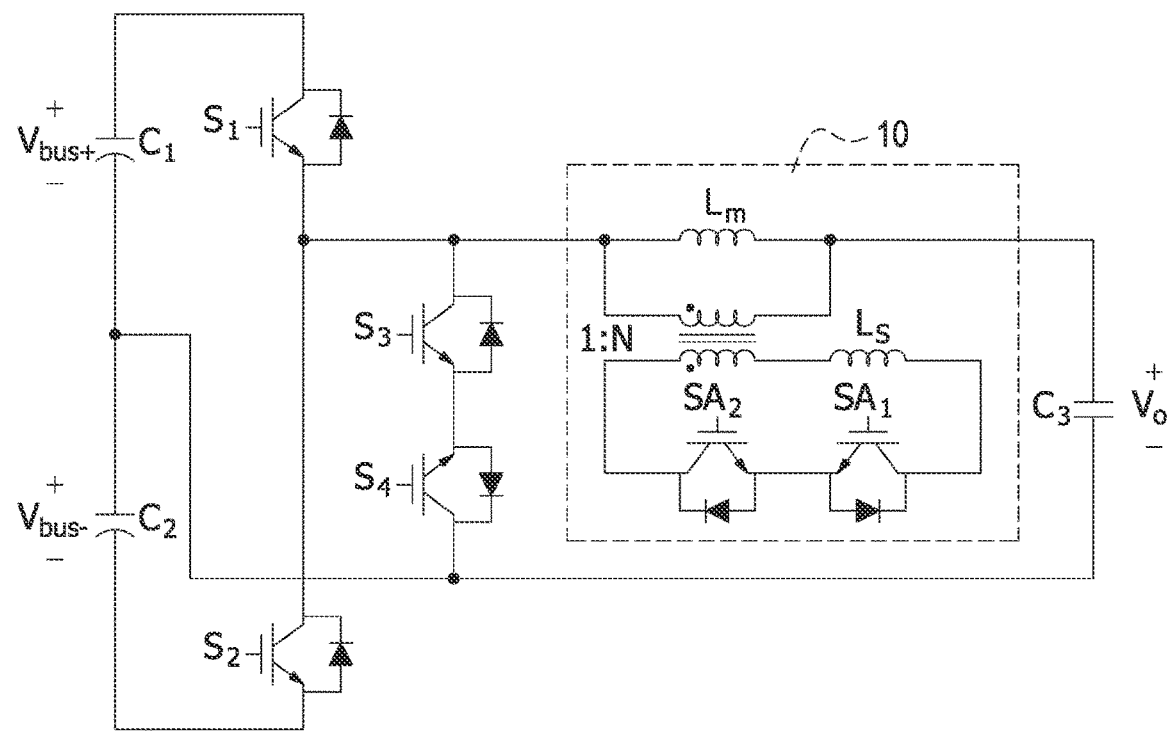
FIG. 26 is a circuit diagram of using the inductive coupled unit shown in FIG. 7A in a T-type inverter according to the present disclosure.
Figure 27:
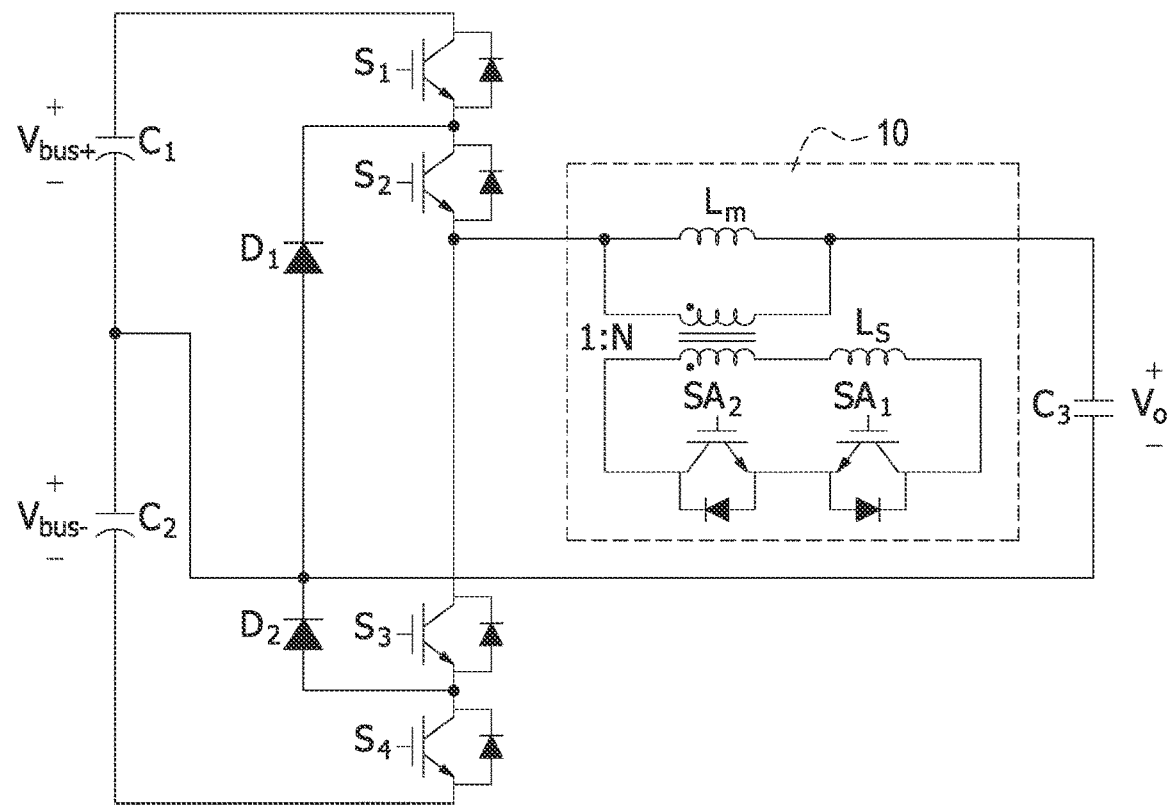
FIG. 27 is a circuit diagram of using the inductive coupled unit shown in FIG. 7A in a multi-stage inverter according to the present disclosure.
Figure 28:
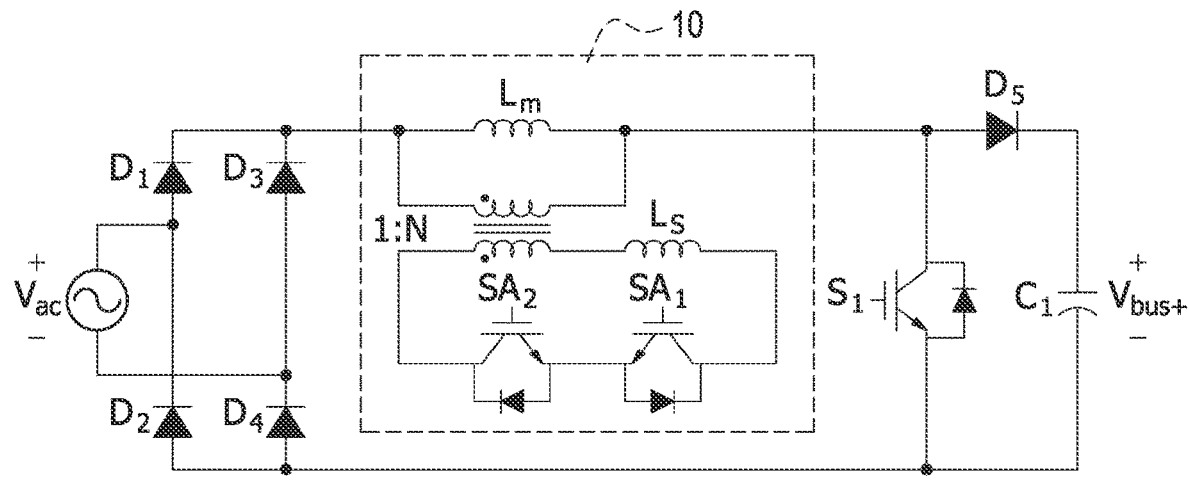
FIG. 28 is a circuit diagram of using the inductive coupled unit shown in FIG. 7A in a single-bus boost PFC circuit according to the present disclosure.
Figure 29:
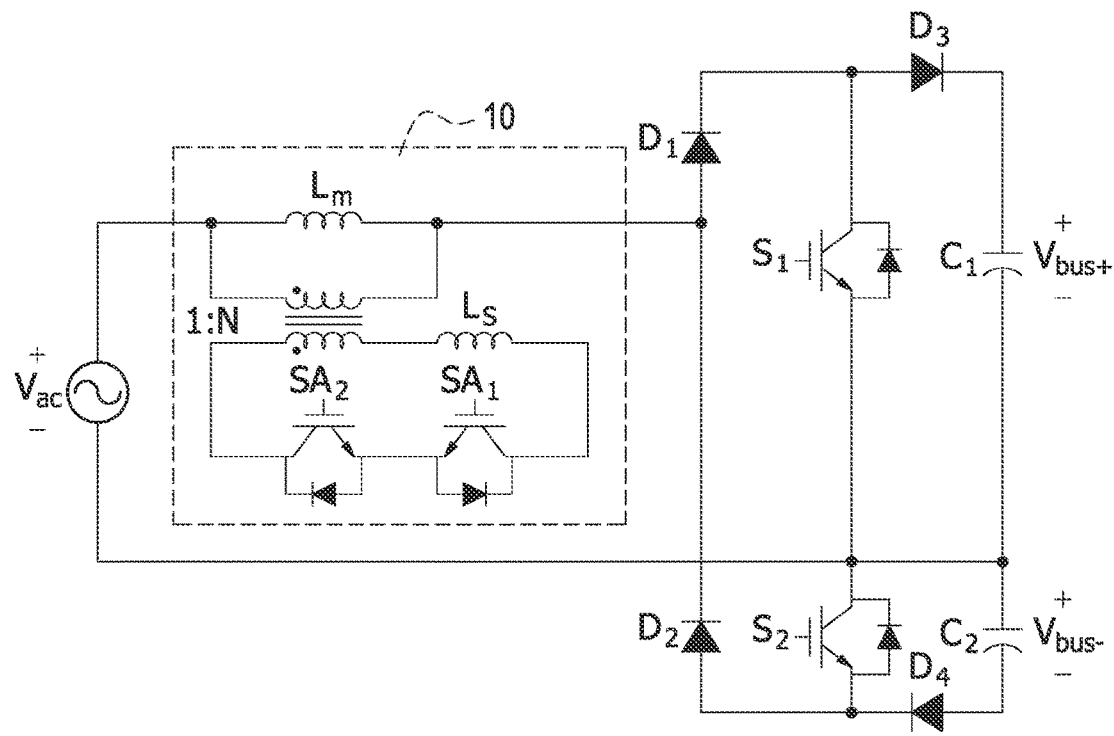
FIG. 29 is a circuit diagram of using the inductive coupled unit shown in FIG. 7A in a dual-bus boost PFC circuit according to the present disclosure.
Figure 30:
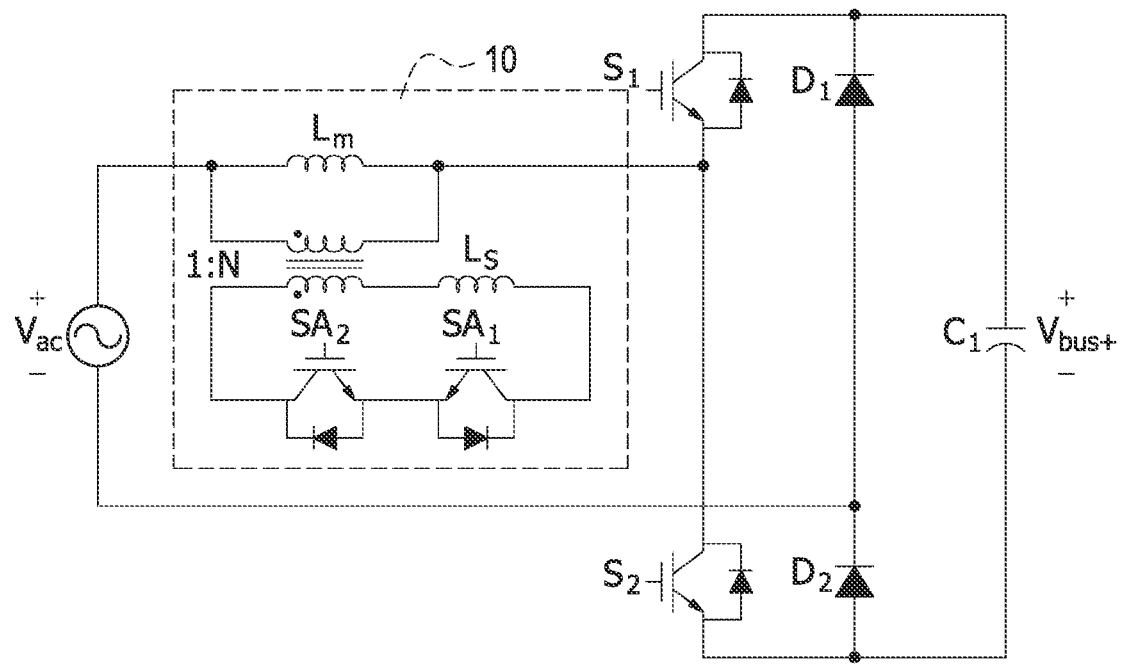
FIG. 30 is a circuit diagram of using the inductive coupled unit shown in FIG. 7A in a single-bus Totem-pole PFC circuit according to the present disclosure.
Figure 31:
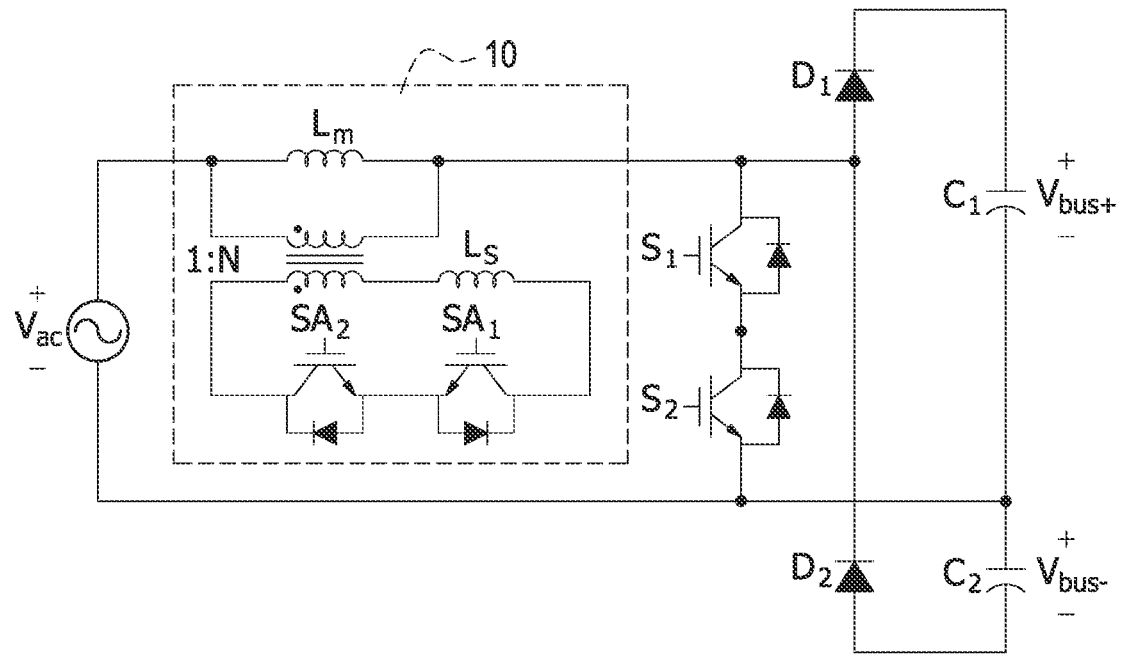
FIG. 31 is a circuit diagram of using the inductive coupled unit shown in FIG. 7A in a dual-bus bridgeless PFC circuit according to the present disclosure.

Accordingly, the inductive coupled unit 10 of the present disclosure can be used not only for the buck converter and the boost converter, but also for the full-bridge inverter (as shown in FIG. 24), the half-bridge inverter (as shown in FIG. 25), the T-type inverter (as shown in FIG. 26), the multi-stage inverter (as shown in FIG. 27), the single-bus boost PFC circuit (as shown in FIG. 28), the dual-bus boost PFC circuit (as shown in FIG. 29), the single-bus Totem-pole PFC circuit (as shown in FIG. 30), and the dual-bus bridgeless PFC circuit (as shown in FIG. 31). However, the application of the inductive coupled unit 10 of the present disclosure is not limited to the above-mentioned circuits. For example, any circuit topology that needs to use inductive components for zero-voltage and/or zero-current switching can use the inductive coupled unit 10 in the present disclosure. Please also refer to FIG. 7A to FIG. 9B, since the first couple end A and the second couple end B of the main inductance 11 may be coupled to two ends of connecting the inductor in the conventional power converter to replace the conventional inductor, the inductive coupled unit 10 shown in FIG. 24 to FIG. 31 can be also replaced by different circuit diagrams.

In particular, the half-bridge inverter (i.e., the half-bridge DC-to-AC power converter) shown in FIG. 25 includes a first switch $S_1$, a second switch $S_2$, and the inductive coupled unit 10. The second switch $S_2$ is coupled to the first switch $S_1$ at a common-connected node. A first end of the inductive coupled unit 10 is coupled to the common-connected node. In one cycle period, the first switch $S_1$ and the second switch $S_2$ are alternately turned on and turned off. In the positive-half cycle, the principle and operation of the half-bridge inverter may be similar to the embodiment shown in FIG. 10, that is, its specific operation may be correspondingly referred to the description of FIG. 10, and the detail description is omitted here for conciseness. In the negative-half cycle, the role of the main switch $S_1$ and that of the energy-releasing switch $S_2$ will be changed, and the role of the first transistor switch $SA_1$ and that of the second transistor switch $SA_2$ will be changed. Therefore, the zero-voltage switching and the zero-current switching can be implemented.

Compared with the half-bridge inverter shown in FIG. 25, the T-type inverter shown in FIG. 26 further includes a third switch $S_3$ and a fourth switch $S_4$. The fourth switch is connected to the third switch in series to form a series-connected structure, and the series-connected structure is coupled between a first end and a second of the inductive coupled unit 10. Similarly, in one cycle period, the first switch $S_1$ and the second switch $S_2$ are alternately turned on and turned off, and the first transistor switch $SA_1$ and the second transistor switch $SA_2$ are correspondingly turned on and turned off so implement the zero-voltage switching and the zero-current switching.

In summary, the present disclosure has the following features and advantages:

1. The zero-voltage switching and the zero-current switching can be easily implemented by collocating the auxiliary switch unit with the inductive coupled unit, which is formed by winding the coupling coil on the main inductance or designing the main inductance in a tapped coupling manner.

2. In the application of the power converter, the coupled inductance replaces the additional inductor and the additional capacitor. Therefore, no additional passive component is used to significantly reduce the circuit volume and increase efficiency and power density, and this circuit uses a coil coupling manner with the function of electrical isolation, which can further simplify the design of the drive circuit for switches.

3. The inductive coupled unit of the present invention can flexibly cooperate with the application occasions of the required circuit topology to realize the soft-switching function.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A soft-switching power converter, comprising:
a main switch being a controllable switch,
an energy-releasing switch coupled to the main switch, and
an inductive coupled unit coupled to the main switch and the energy-releasing switch, the inductive coupled unit comprising:
a main inductor,
an auxiliary inductor wound on the main inductor, and
an auxiliary switch unit coupled to the auxiliary inductor to form a closed loop,
wherein the main switch and the energy-releasing switch are alternately turned on and turned off, and the auxiliary switch unit is controlled to start turning on before the main switch is turned on so as to provide at least one current path;
wherein the inductive coupled unit further comprises a circular magnet on which the main inductor is wound, the auxiliary inductor is wound on the circular magnet, the main inductor has a first couple end coupled to the main switch and a second couple end coupled to an output capacitor of the soft-switching power converter, and the first couple end is disposed adjacent to the second couple end on the circular magnet;
wherein the auxiliary inductor has a third couple end coupled to one end of the auxiliary switch unit, and a fourth coupled end coupled to another end of the auxiliary switch unit, and the third couple end is disposed opposite to the fourth coupled end on the circular magnet;
wherein a coil turns ratio between the main inductor and the auxiliary inductor is 1:N, wherein N is a natural number; and
wherein when a leakage inductor current of the auxiliary inductor increases to be greater than 1/N of a magnetizing inductor current of the main inductor, the auxiliary switch unit starts turning on before the energy-releasing switch is turned off so that the main switch operates in a zero-voltage switching mode.

2. The soft-switching power converter as claimed in claim 1, wherein when the leakage inductor current rises to a same magnitude as the magnetizing inductor current of the main inductor, the auxiliary switch unit starts turning on after the energy-releasing switch is turned off so that the main switch operates in a zero-current switching mode.

3. The soft-switching power converter as claimed in claim 1, wherein the inductive coupled unit is in a single-directional current operation, and the auxiliary switch unit comprises:
an auxiliary switch being a controllable switch, and
an auxiliary diode connected to the auxiliary switch in series to form a series-connected structure to provide at least one current path.

4. The soft-switching power converter as claimed in claim 1, wherein the inductive coupled unit is in a bidirectional current operation, and the auxiliary switch unit comprises:
a first transistor switch, and
a second transistor switch connected to the first transistor switch in series to form a series-connected structure to provide two current paths with opposite currents,
wherein the series-connected structure is coupled to two ends of the auxiliary inductor.

5. A soft-switching power converter being a DC-to-AC power converter, comprising:
a first switch,
a second switch coupled to the first switch at a common-connected node, and
an inductive coupled unit having a first end and a second end, the first end coupled to the common-connected node, the inductive coupled unit comprising:
a main inductor,
an auxiliary inductor wound on the main inductor, and
an auxiliary switch unit coupled to the auxiliary inductor to form a closed loop,
wherein in one cycle period, the first switch and the second switch are alternately turned on and turned off, and the auxiliary switch unit is controlled to start turning on before the first switch is turned on so as to provide at least one current path;
wherein the inductive coupled unit further comprises a circular magnet on which the main inductor is wound, the auxiliary inductor is wound on the circular magnet, the main inductor has a first couple end coupled to the main switch and a second couple end coupled to an output capacitor of the soft-switching power converter, and the first couple end is disposed adjacent to the second couple end on the circular magnet;
wherein the auxiliary inductor has a third couple end coupled to one end of the auxiliary switch unit, and a fourth coupled end coupled to another end of the auxiliary switch unit; and the third couple end is disposed opposite to the fourth coupled end on the circular magnet;

wherein a coil turns ratio between the main inductor and the auxiliary inductor is 1:N, wherein N is a natural number; and wherein when a leakage inductor current of the auxiliary inductor increases to be greater than 1/N of a magnetizing inductor current of the main inductor, the auxiliary switch unit starts turning on before the energy-releasing switch is turned off so that the main switch operates in a zero-voltage switching mode.

* * * * *